(12) United States Patent
Kuratani et al.

(10) Patent No.: US 12,290,937 B2
(45) Date of Patent: May 6, 2025

(54) INTERFERENCE EVALUATION DEVICE, METHOD, AND PROGRAM

(71) Applicant: OMRON Corporation, Kyoto (JP)

(72) Inventors: Ryoichi Kuratani, Kyoto (JP); Akane Nakashima, Kyoto (JP); Takeshi Kojima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/766,707

(22) PCT Filed: Oct. 9, 2020

(86) PCT No.: PCT/JP2020/038334
§ 371 (c)(1),
(2) Date: Apr. 5, 2022

(87) PCT Pub. No.: WO2021/075380
PCT Pub. Date: Apr. 22, 2021

(65) Prior Publication Data
US 2024/0066705 A1 Feb. 29, 2024

(30) Foreign Application Priority Data

Oct. 17, 2019 (JP) .................................. 2019-190559

(51) Int. Cl.
*B25J 9/16* (2006.01)
(52) U.S. Cl.
CPC .......... *B25J 9/1676* (2013.01); *B25J 9/1666* (2013.01); *B25J 9/1682* (2013.01)
(58) Field of Classification Search
CPC ....... B25J 9/1676; B25J 9/1666; B25J 9/1682
See application file for complete search history.

(56) References Cited

U.S. PATENT DOCUMENTS 9,895,803 B1 * 2/2018 Oslund ................. B25J 9/1666
2014/0163729 A1 * 6/2014 Shi ........................ B25J 9/1612
901/31
(Continued)

FOREIGN PATENT DOCUMENTS

CN 104156520 A 11/2014
CN 104969134 A 10/2015
(Continued)

OTHER PUBLICATIONS

Jimenez et al., "3D Collision Detection: A Survey", Computers & Graphics, vol. 25, Issue 2, Apr. 2001, pp. 269-285 (Year: 2001).*
(Continued)

*Primary Examiner* — Khoi H Tran
*Assistant Examiner* — Nhi Q Bui
(74) *Attorney, Agent, or Firm* — Morgan, Lewis & Bockius LLP

(57) ABSTRACT

The present disclosure provides an acquisition unit acquiring an installation position, which serves as a point of origin within a range in which each of a plurality of robots can move, a start position, which is a prescribed location of each of the plurality of robots when in a starting posture, and an end position, which is a prescribed location when in a final posture, and an evaluation unit evaluates, for each of the plurality of robots, the risk of interference between the plurality of robots on the basis of overlap between polyhedra defined on the basis of polygons that include the installation position, the start position and the end position.

18 Claims, 19 Drawing Sheets

(56) References Cited

U.S. PATENT DOCUMENTS

| | | | |
|---|---|---|---|
| 2015/0328776 A1 | 11/2015 | Shiratsuchi | |
| 2015/0363935 A1 | 12/2015 | Motoyoshi | |
| 2016/0039090 A1* | 2/2016 | Oyamada | B25J 9/163 901/3 |
| 2016/0121480 A1* | 5/2016 | Okahisa | B25J 9/1643 700/245 |
| 2018/0246529 A1* | 8/2018 | Hu | G05D 1/0038 |
| 2018/0250818 A1* | 9/2018 | Maeda | B25J 9/1682 |

FOREIGN PATENT DOCUMENTS

| | | | |
|---|---|---|---|
| CN | 105291101 A | | 2/2016 |
| CN | 106546759 A | * | 3/2017 |
| EP | 3195990 A1 | | 7/2017 |
| JP | H05-119814 A | | 5/1993 |
| JP | 2012-181574 A | | 9/2012 |
| JP | 2018-144223 A | | 9/2018 |
| WO | 2014/122995 A1 | | 8/2014 |

OTHER PUBLICATIONS

International Search Report issued in corresponding International Patent Application No. PCT/JP2020/038334 dated Dec. 8, 2020.
Written Opinion issued in corresponding International Patent Application No. PCT/JP2020/038334 dated Dec. 8, 2020.
Jiménez et al., "3D collision detection: a survey", Computers & Graphics, vol. 25, Issue 2, Apr. 2001, pp. 269-285, XP004232467.
Jiménez et al., "Collision Detection Algorithms for Motion Planning", Robot Motion Planning and Control, Springer, vol. 229, Jan. 1998, pp. 305-343, XP055546046.
Extended European Search Report dated Oct. 10, 2023 issued in related European Application No. 20876395.3.
Office Action issued in corresponding Chinese Patent Application No. 2020800707764 dated Dec. 19, 2023 with partial English translation.
Office Action dated Jan. 23, 2024, issued in corresponding Japanese Patent Application No. 2019-190559.

* cited by examiner

INTERFERENCE EVALUATION DEVICE, METHOD, AND PROGRAM

TECHNICAL FIELD

The technique of the disclosure relates to an interference evaluating device, an interference evaluating method and an interference evaluating program.

BACKGROUND ART

In conventional techniques, at the time of generating motions of plural robots, in order to avoid interference between the robots, the nearing of actual robots to one another is detected by sensors after the robots are moved, or whether or not the robots are interfering with one another is judged by carrying out simulations.

For example, a device has been proposed that checks interference between a workpiece and plural movable objects that are formed from robots, and automatically corrects a motion program in which interference arises. This device acquires shape data of the plural movable objects and the motion program, and, on the basis of the shape data, creates plural movable object models, and, on the basis of the motion program and the movable object models, simulates motions of the plural movable object models. Then, on the basis of the results of simulation, this device judges the absence/presence of interference between the plural movable object models (Patent Document 1: Japanese Patent Application Laid-Open (JP-A) No. 2012-181574).

SUMMARY OF INVENTION

Technical Problem

However, in cases of detecting the approaching of actual robots to one another, there is the problem that, because the starting points of avoiding trajectories are in states in which the robots are close to one another, there are cases in which the generation of trajectories is impossible, or the trajectories become redundant trajectories. Further, in cases in which simulations are carried out as in the device of Patent Document 1, there is the problem that time and computing costs are required until it is judged whether or not the generating of avoiding trajectories is needed.

The technique of the disclosure has been made in consideration of the above-described points, and an object thereof is to reduce the computing costs required for evaluating the risk of interference between robots, at the time of generating motions of plural robots.

Solution to Problem

In order to achieve the above-described object, an interference evaluating device relating to the technique of the disclosure is structured to include: an acquiring section that acquires set positions that are points of origin of movable ranges of a plurality of robots, respectively, starting positions that are positions of predetermined regions of the plurality of robots, respectively, at times of being in starting poses, and ending positions that are positions of the predetermined regions at times of being in ending poses; and an evaluating section that evaluates a risk of interference among the plurality of robots based on overlapping of polyhedrons that are specified on the basis of polygons that include the set positions, the starting positions and the ending positions of the plurality of robots respectively.

Further, the evaluating section can specify the polyhedrons whose bottom surfaces are polygons obtained by projecting the polygons onto planes that are planes in which the robots are set, and that have predetermined heights in directions normal to the planes.

Further, the evaluating section can specify the polyhedrons on the basis of the polygons that further include, as vertices thereof, positions of via points that are other than the starting positions and the ending positions and that are included in the trajectory information.

Further, the acquiring section can acquire the starting positions corresponding to the starting poses and the ending positions that correspond to the ending poses, which are included in trajectory information that expresses trajectories of motions of the plurality of robots respectively.

Further, the acquiring section can acquire, for the plurality of robots respectively, trajectory information expressing trajectories of motions and including information of the starting poses and the ending poses, and specification information including kinematic information and shape information, and, based on the trajectory information and the specification information, can compute the setting positions, the starting positions and the ending positions of the plurality of robots respectively.

Further, the evaluating section can specify the polyhedrons based on the polygons that further include, as vertices thereof, positions of via points that are other than the starting positions and the ending positions and that are included in the trajectory information.

Further, the acquiring section can acquire the trajectory information and the specification information per motion of work that includes a plurality of motions, and the evaluating section can evaluate risk of the overall work by evaluating interference risk between the robots for each combination of the plurality of motions structuring the work.

Further, the higher a proportion of motions, which have a risk of interference between robots, among the plurality of motions that are included in the work, the higher the risk of the overall work can be evaluated to be by the evaluating section.

Further, the interference evaluating device can be structured to further include a generating section that generates trajectories from the starting poses to the ending poses.

Further, the generating section can generate avoiding trajectories that avoid interference, in a case in which it is evaluated that there is a risk of interference between the robots by the evaluating section.

Further, the generating section can acquire peripheral environment information that includes information of objects at peripheries of areas in which the plurality of robots move, and generate the avoiding trajectories that avoid an overlapping portion of the polyhedrons, and the objects that are at the peripheries of the plurality of robots.

Further, the generating section can generate the avoiding trajectories in a case in which an interference risk evaluated by the evaluating section is greater than or equal to a threshold value.

Further, an interference evaluating method relating to the technique of the disclosure is a method in which: acquiring set positions that are points of origin of movable ranges of a plurality of robots, respectively, starting positions that are positions of predetermined regions of the plurality of robots, respectively, at times of being in starting poses, and ending positions that are positions of the predetermined regions at times of being in ending poses; and evaluating a risk of interference among the plurality of robots based on overlapping of polyhedrons that are specified based on polygons that include the set positions, the starting positions and the ending positions of the plurality of robots respectively.

Further, an interference evaluating program relating to the technique of the disclosure is a program executable by a computer to function as: an acquiring section that acquires set positions that are points of origin of movable ranges of a plurality of robots, respectively, starting positions that are positions of predetermined regions of the plurality of robots, respectively, at times of being in starting poses, and ending positions that are positions of the predetermined regions at times of being in ending poses; and an evaluating section that evaluates a risk of interference among the plurality of robots based on overlapping of polyhedrons that are specified based on polygons that include the set positions, the starting positions and the ending positions of the plurality of robots respectively.

Advantageous Effects of Invention

In accordance with the interference evaluating device, method and program relating to the technique of the disclosure, at the time of generating motions of plural robots, the computing costs required for evaluating the risk of interference between the robots can be reduced.

DESCRIPTION OF EMBODIMENTS

Figure 1:
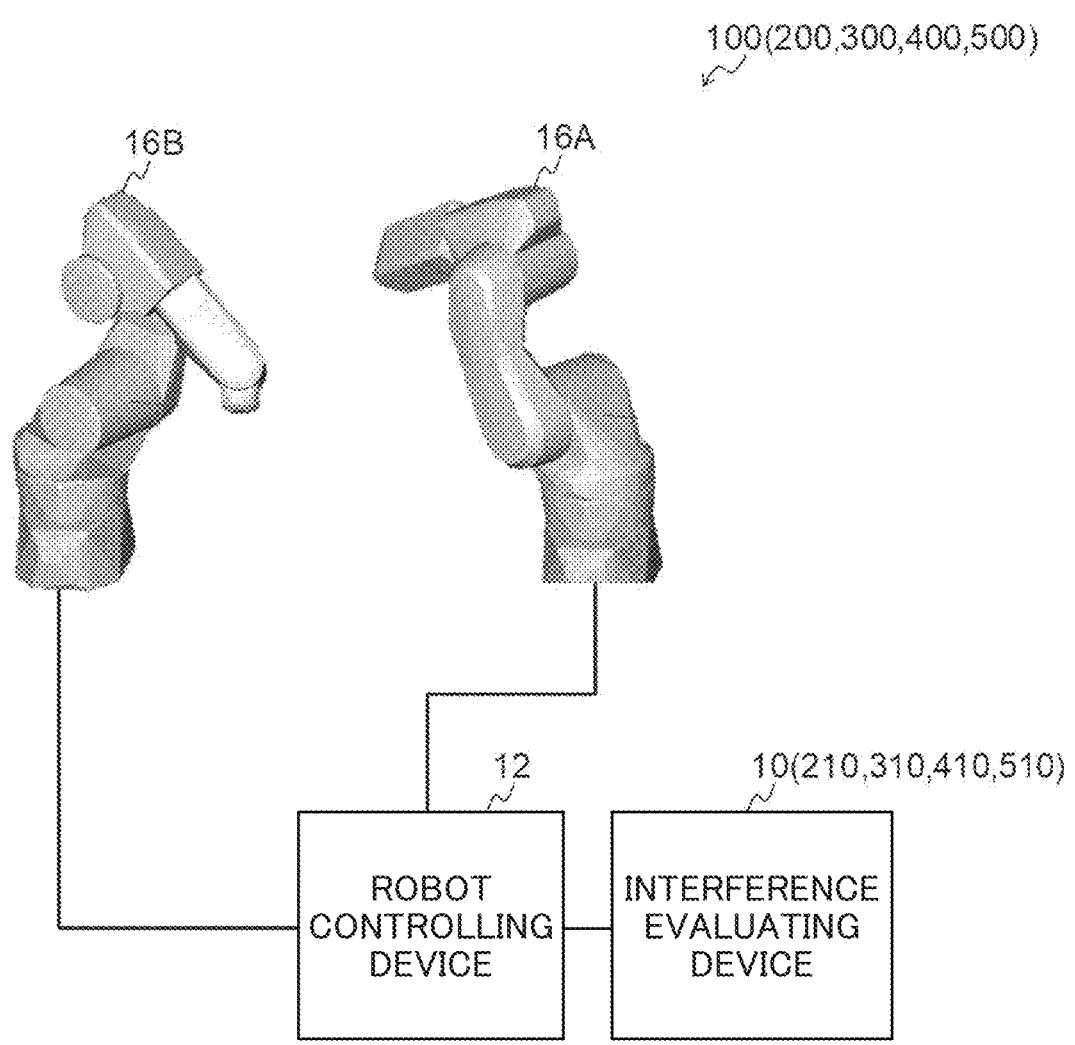
FIG. 1 is a drawing illustrating the schematic structure of robot controlling systems relating to first through fifth embodiments.

Examples of embodiments of the technique of the disclosure are described hereinafter with reference to the drawings. Note that structural elements and portions that are the same or equivalent are denoted by the same reference numerals in the respective drawings. Further, the dimensions and proportions in the drawings are exaggerated for convenience of explanation, and there are cases in which they differ from actual proportions.

First Embodiment

As illustrated in FIG. 1, a robot controlling system 100 relating to a first embodiment is structured to include an interference evaluating device 10, a robot controlling device 12, and robots 16A, 16B. Note that the example of FIG. 1 illustrates a case in which the two robots 16A, 16B are included in the robot controlling system 100, but three or more robots may be included. Further, in the following description, when the robots 16A, 16B are described without differentiating therebetween, they are simply called the "robot 16".

The robot 16 is, for example, a vertical articulated robot having a structure of the six degrees of freedom that are needed for motions in a three-dimensional space. Note that the degrees of freedom of the robot 16 may be seven degrees of freedom, in which a redundant degree of freedom is added to the six degrees of freedom. The robot 16 moves by being controlled by the robot controlling device 12, in accordance with trajectory information that is outputted from the interference evaluating device 10.

The robot controlling device 12 controls the motions of the robots 16 in accordance with trajectory information outputted from the interference evaluating device 10.

The interference evaluating device 10 evaluates the risk of interference between the robot 16A and the robot 16B at the time when the respective robots 16A, 16B are moved in accordance with the trajectory information. Further, in a case in which the risk of interference is high, the interference evaluating device 10 generates trajectory information that expresses avoiding trajectories by which interference is avoided, and outputs the trajectory information to the robot controlling device 12.

In the present embodiment, the trajectory information is information in which poses, at respective times, of the robot 16 when a predetermined position of the end effector of the robot 16 (the side of the robot hand or the like at which a tool is mounted) is moved from an arbitrary starting point to ending point, and velocities and accelerations at which the poses are changed, are lined-up in time series. The pose of the robot 16 is expressed by a series ($\theta_{J1}, \theta_{J2}, \ldots, \theta_{JN}$) of values (rotational angles) of the respective joints from a first joint (joint J1) to an Nth joint (joint JN, a N being the number of joints of the robot) of the robot 16, in a case in which the predetermined position of the end effector of the robot 16 is assumed to be at a given position (x, y, z) and pose (roll, pitch, yaw).

Figure 2:
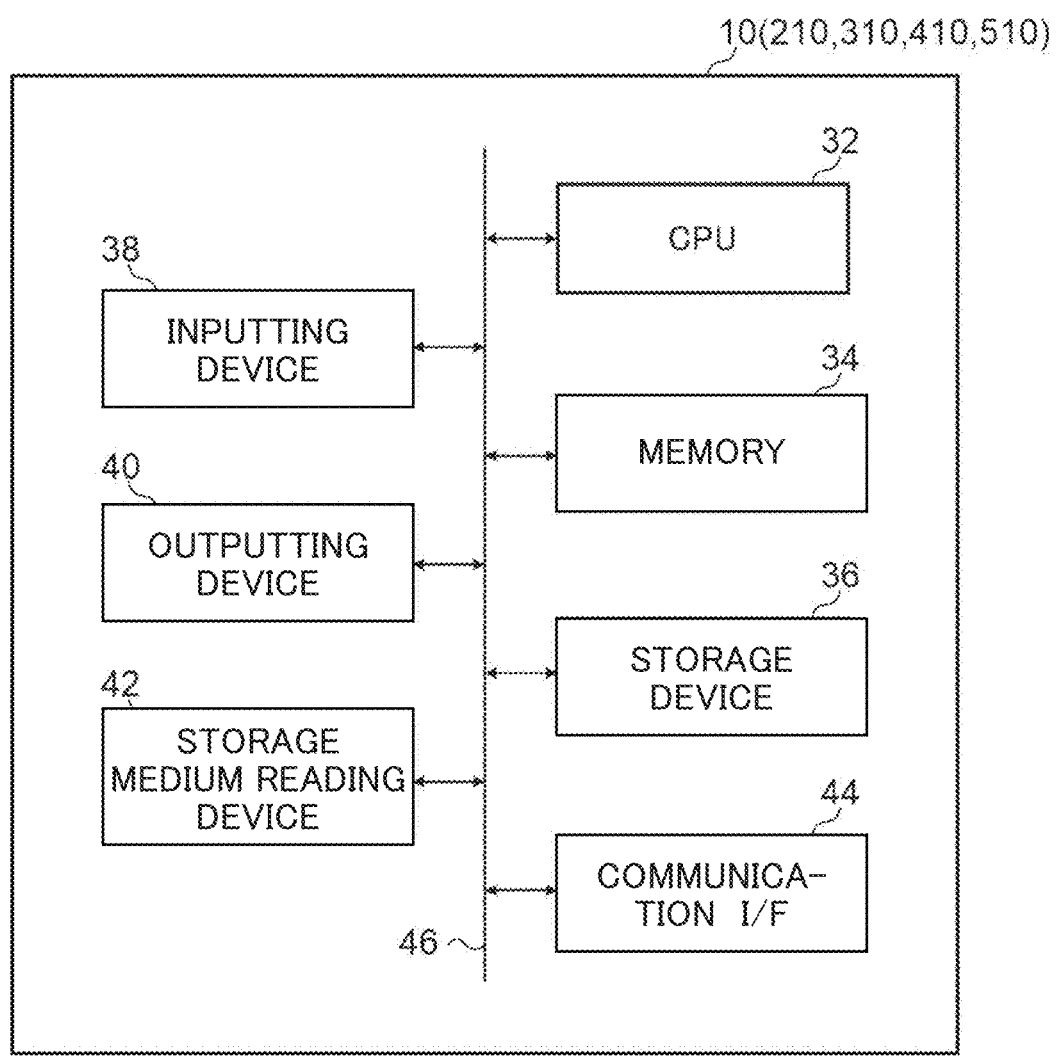
FIG. 2 is a block drawing illustrating hardware structures of interference evaluating devices relating to the first through fifth embodiments.

FIG. 2 is a block drawing illustrating hardware structures of the interference evaluating device 10 relating to the present embodiment. As illustrated in FIG. 2, the interference evaluating device 10 has a CPU (Central Processing Unit) 32, a memory 34, a storage device 36, an inputting device 38, an outputting device 40, a storage medium reading device 42, and a communication I/F (Interface) 44. These respective structures are connected via a bus 46 so as to be able to communicate with one another.

An interference evaluating program for executing interference evaluation processing is stored in the storage device 36. The CPU 32 is a central computing processing unit, and executes various programs and controls various structures. Namely, the CPU 32 reads-out a program from the storage device 36, and executes the program by using the memory 34 as a workspace. The CPU 32 carries out control of the above-described respective structures, and various computing processings, in accordance with programs that are stored in the storage device 36.

The memory 34 is structured by a RAM (Random Access Memory), and temporarily stores programs and data as a workspace. The storage device 36 is structured by a ROM (Read Only Memory) and an HDD (Hard Disk Drive), an SSD (Solid State Drive) or the like, and stores various programs, including the operating system, and various data.

The inputting device 38 is a device for carrying out various types of input, such as a keyboard or a mouse or the like for example. The outputting device 40 is a device for outputting various types of information, such as a display or a printer or the like for example. The outputting device 40 may be made to function as the inputting device 38 by using a touch panel display as the outputting device 40. The storage medium reading device 42 carries out reading of data that are stored on various types of storage media such as a CD (Compact Disc)-ROM, a DVD (Digital Versatile Disc)-ROM, a flexible disk, a USB (Universal Serial Bus) memory, or the like, and writing of data onto recording media, and the like.

The communication I/F 44 is an interface for communication with other equipment, and utilizes standards such as, for example, Ethernet®, FDDI, Wi-Fi®, or the like.

Functional structures of the interference evaluating device 10 relating to the first embodiment are described next.

Figure 3:
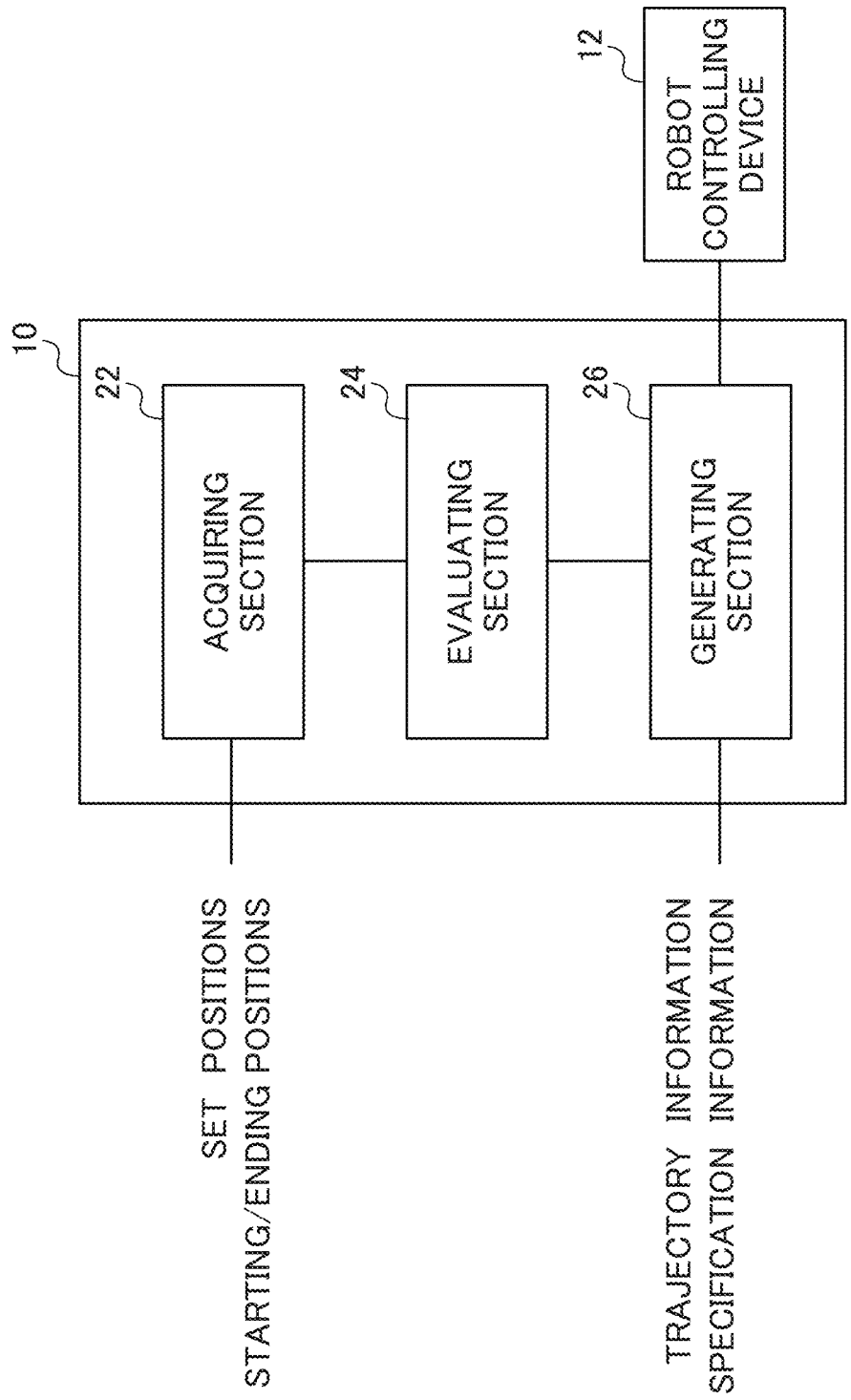
FIG. 3 is a block drawing illustrating an example of functional structures of the interference evaluating device relating to the first embodiment.

FIG. 3 is a block drawing illustrating an example of the functional structures of the interference evaluating device 10. As illustrated in FIG. 3, the interference evaluating device 10 includes, as the functional structures thereof, an acquiring section 22, an evaluating section 24 and a generating section 26. These respective functional structures are realized by the CPU 32 reading-out the interference evaluating program that is stored in the storage device 36, and expanding and executing the program in the memory 34.

The acquiring section 22 acquires the set position of each of the robots 16A, 16B, and the starting position and the ending position of a predetermined region of each of the robots 16A, 16B (in the present embodiment, the end effector of the robot 16). The information of the set positions, the starting positions and the ending positions are inputted to the interference evaluating device 10 by a user.

Figure 4:
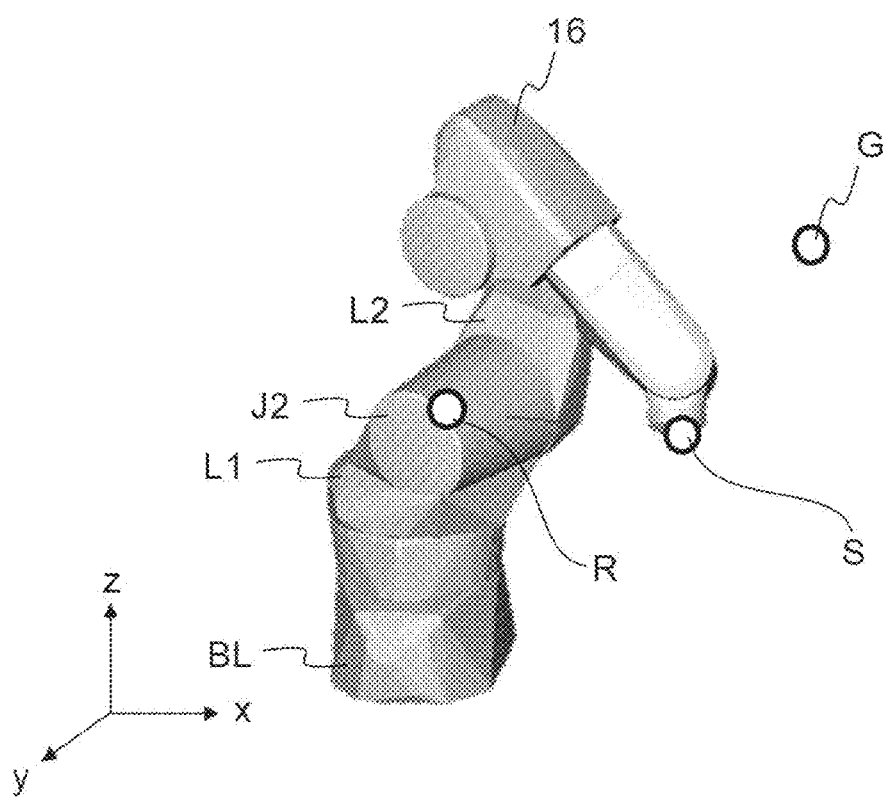
FIG. 4 is a drawing for explaining a starting position and an ending position.

The starting position is the position of the predetermined region at the time of the starting pose of the motion executed by the robot 16A, 16B, and the ending position is the position of the predetermined region at the time of the ending pose. Examples of starting position S and ending position G are illustrated in FIG. 4.

Further, the set position is the position that is the point of origin of the movable range of the robot 16. For example, given that the plane in which the robot 16 is set is the xy plane, and that the normal line direction of the xy plane is the z-axis, as illustrated in FIG. 4, the set position R can be determined by using the rotational center of base link BL of the robot 16 as the x coordinate and they coordinate, and by using the central position of the second joint (joint J2), which is the connecting mechanism of link L1 and link L2, as the z coordinate. Note that the set position is not limited to this example, and it suffices to determine the set position by taking the structure of the robot 16, the movable range, or the like into consideration.

The acquiring section 22 transfers the information of the acquired set positions R, starting positions S and ending positions G to the evaluating section 24.

The evaluating section 24 evaluates the risk of interference between the robots 16A, 16B at the time when the robots 16A, 16B respectively execute motions, on the basis of the overlapping of the polyhedrons that are specified on the basis of the polygons that include the set positions R, the starting positions S and the ending positions G of the respective robots 16A, 16B.

Figure 5:
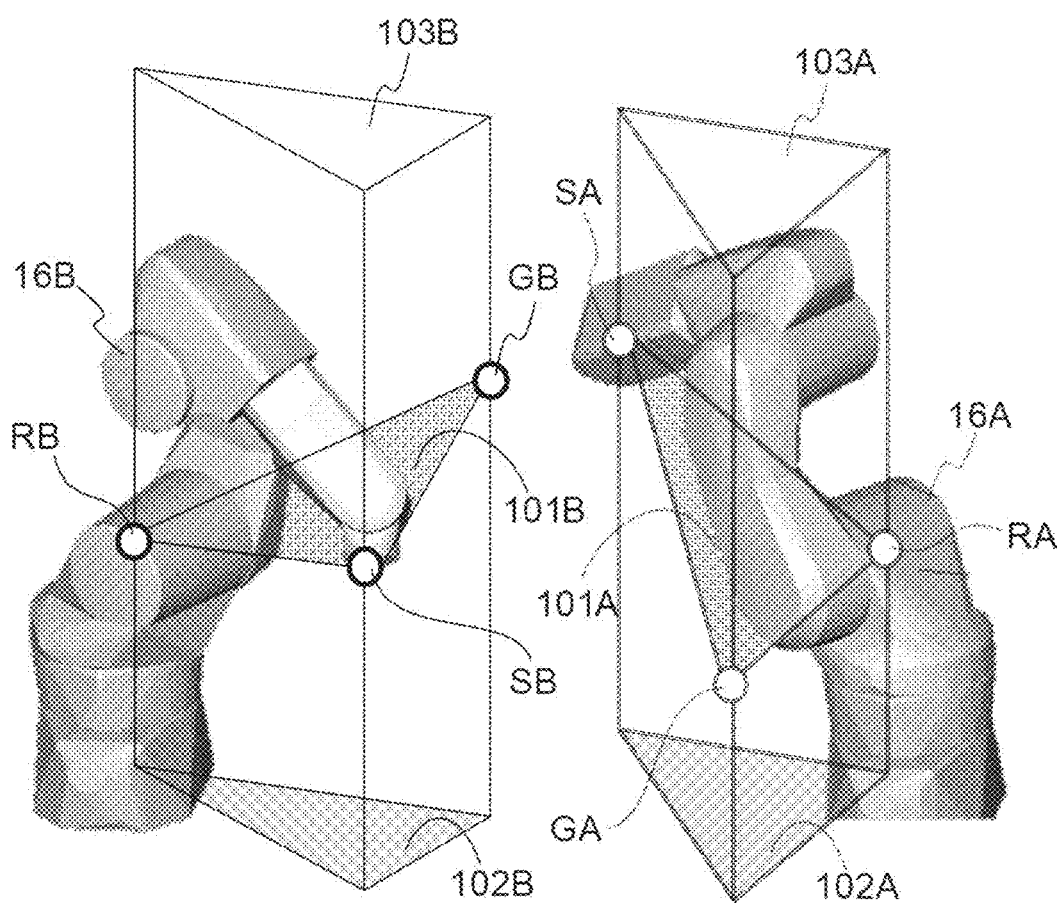
FIG. 5 is a drawing for explaining triangular columns that are based on set positions, the starting positions and the ending positions.

Specifically, as illustrated in FIG. 5, the evaluating section 24 specifies a triangular column 103 of a predetermined height (e.g., the highest reached point of the end effector of the robot 16) whose bottom surface is a triangle 102 that is obtained by projecting, onto the xy plane that is the plane in which the robot 16 is set, a triangle 101 whose vertices are the set position R, the starting position S and the ending position G. The evaluating section 24 may further add predetermined margins to the triangular column 103 that is specified. Note that, in FIG. 5, A is appended to the reference numerals for the robot 16A, and B is appended to the reference numerals for the robot 16B.

Figure 6:
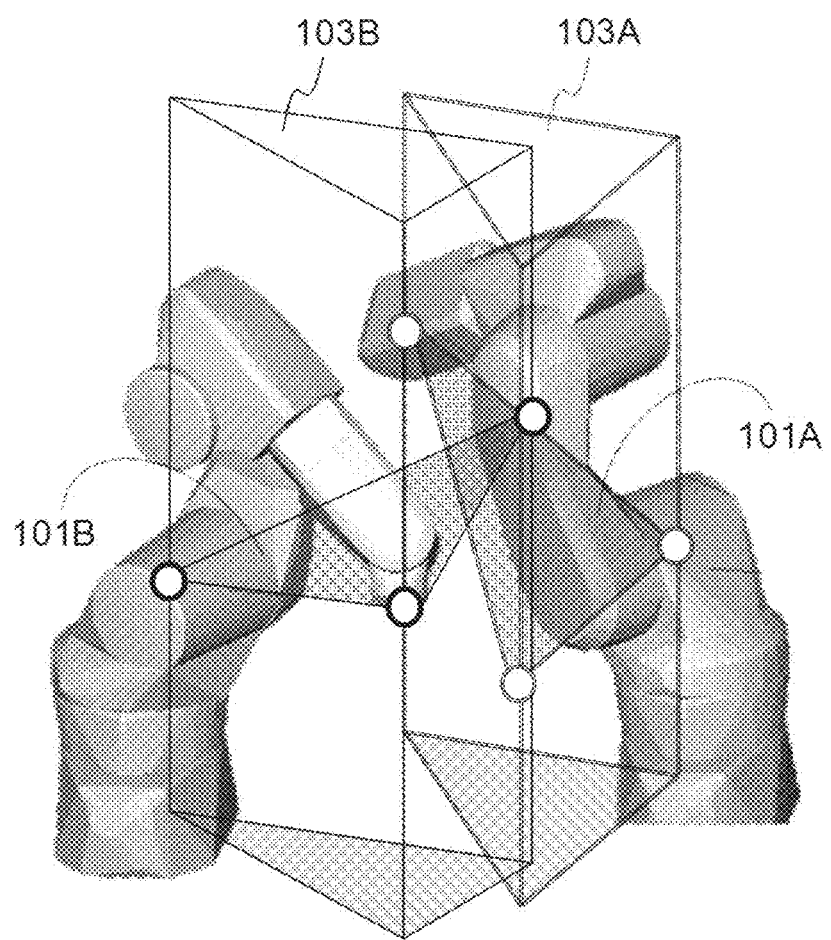
FIG. 6 is a drawing for explaining evaluation of the risk of interference, by using overlapping of the triangular columns.
Figure 7:
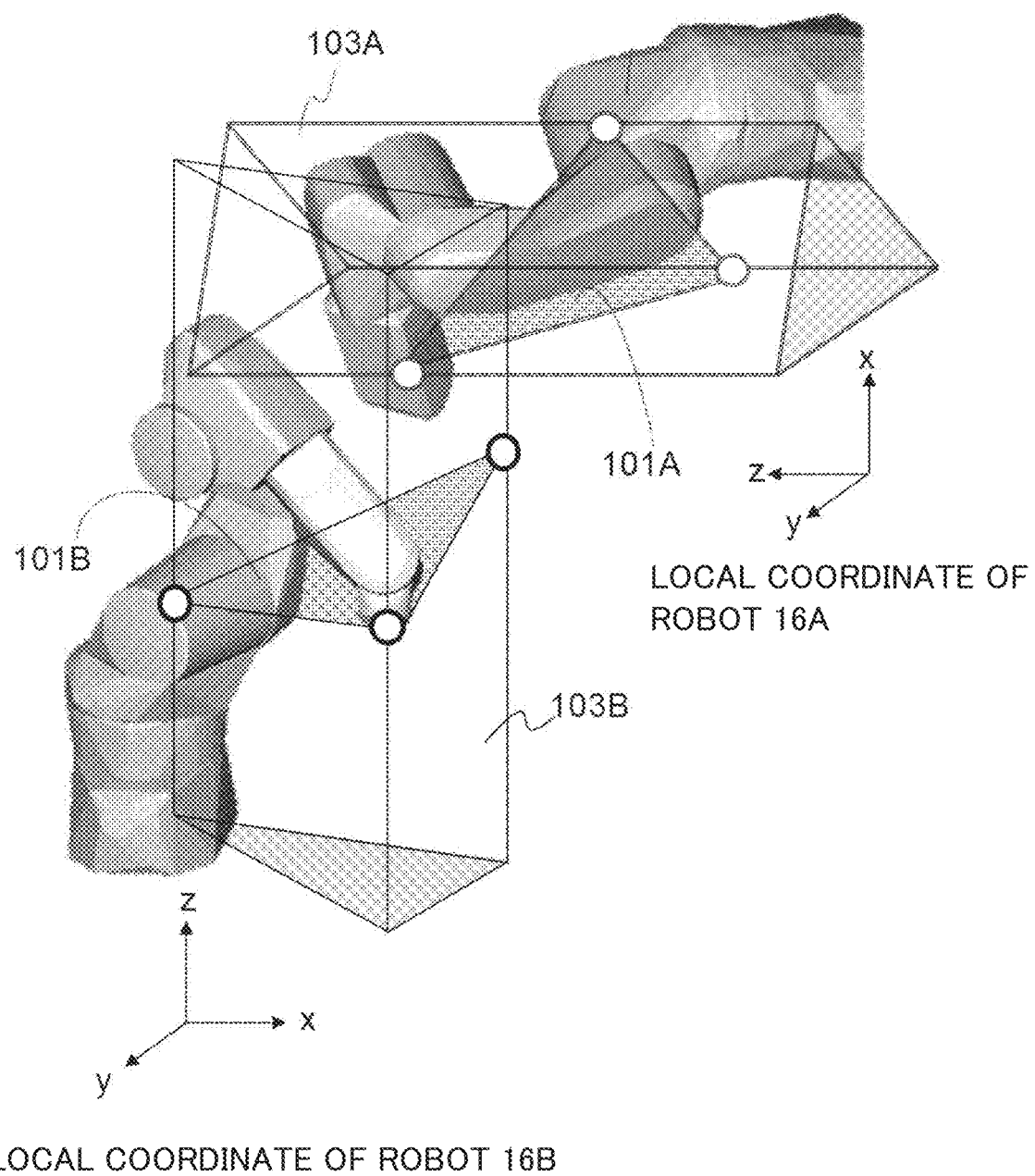
FIG. 7 is a drawing for explaining evaluation of the risk of interference, by using overlapping of the triangular columns.

Here, as illustrated in FIG. 6, in a case in which the robots 16A, 16B are set on the same plane, the risk of interference can be evaluated merely by the absence/presence of overlapping of the triangles 101 whose vertices are the set positions R, the starting positions S and the ending positions G. However, the robots 16 can also be set so as to be suspended from the ceiling or mounted to a wall or the like. Cases in which the robots 16A, 16B are not set on the same plane, such as, for example, a case in which the robot 16A is set on a wall surface and the robot 16B is set on the floor surface as illustrated in FIG. 7, can also be supposed. In such cases, there may be cases in which in which an overlapping portion of the triangular columns 103 exists even if there is no overlapping portion between the triangles 101 whose vertices are the set positions R, the starting positions S and the ending positions G.

Further, when using the triangle 101 whose vertices are the set position R, the starting position S and the ending position G, evaluation is carried out only with respect to the trajectory of the end effector in a case of moving the shortest distance from the starting position to the ending position. Therefore, the risk of a link, which is other than the end effector, interfering cannot be evaluated.

Thus, by using polyhedrons (here, the triangular columns 103) such as described above, risk evaluation, which takes into consideration the links from the bases to the end effectors of the robots 16 and that is suited to the vertical articulated robots 16 in particular, can be carried out.

On the basis of the above, the evaluating section 24 evaluates the absence/presence of overlapping of the triangles 101, whose vertices are the set positions R, the starting positions S and the ending positions G, and, in a case in which an overlapping portion exists, the risk of interference is evaluated as being high (hereinafter also called "high risk"). Further, in a case in which no overlapping portion exists at the triangles 101, the evaluating section 24 evaluates the absence/presence of overlapping of the triangular columns 103 that are specified for the respective robots 16, and, in a case in which an overlapping portion exists, evaluates the risk to be high, and, in a case in which no overlapping portion exists, evaluates the risk of interference as being low (hereinafter also called "low risk"). The evaluating section 24 transfers the results of evaluation to the generating section 26.

In a case in which the evaluation by the evaluating section 24 is that there is a risk of interference between the robots 16, the generating section 26 generates avoiding trajectories that avoid interference. The generating section 26 generates the avoiding trajectories so as to avoid the overlapping portion of the triangular columns 103 of the respective robots 16 which were specified by the evaluating section 24. Note that, in a case in which it is evaluated, from the overlapping of the triangles 101 of the respective robots, that the risk is high, it suffices for the generating section 26 to generate avoiding trajectories so as to avoid the overlapping portion of the triangles 101.

Specifically, the generating section 26 acquires trajectory information that expresses the motion from the starting pose to the ending pose of each robot 16, and specification information that includes kinematic information and shape information of each robot 16. The trajectory information that is acquired here is information that corresponds to the starting position and the ending position acquired by the acquiring section 22, and may be information that is generated by motion planning, or may be information that is generated by teaching by a user. Then, the generating section 26 generates, as the avoiding trajectories, trajectories that are from the starting poses and that avoid the overlapping portion of the triangular columns 103 and that reach the ending poses.

Alternatively, the generating section 26 specifies, on the original trajectory expressed by the acquired trajectory information, a first intermediate pose that is immediately before interference, i.e., is immediately before entering into the overlapping portion of the triangular columns 103, and a second intermediate pose that is immediately after interference, i.e., is immediately after exiting from the overlapping portion of the triangular columns 103. Then, the generating section 26 generates a partial trajectory in which the overlapping portion of the triangular columns 103 is avoided, and combines the original trajectory that is from the starting pose to the first intermediate pose, and the generated partial trajectory, and the original trajectory that is from the second intermediate pose to the ending pose, and generates the avoiding trajectory.

In the case of the former avoiding trajectory, the overall trajectory is smooth. In the case of the latter avoiding trajectory, because the original trajectory is utilized, the processing cost for generating the avoiding trajectory can be reduced. Note that the generating section 26 may generate the avoiding trajectory by selecting the former generating method in a case in which the volume of the overlapping portion of the triangular columns 103 is greater than or equal to a predetermined threshold value, and the latter generating method in a case in which the volume is less than the threshold value.

The generating section 26 outputs trajectory information, which expresses the generated trajectories, to the robot controlling device 12. Further, in a case in which the risk is evaluated as being low by the evaluating section 24, the generating section 26 outputs the acquired trajectory information as is to the robot controlling device 12.

Due thereto, the motions of the robots 16A, 16B are controlled by the robot controlling device 12.

Operation of the robot controlling system 100 relating to the first embodiment is described next.

Figure 8:
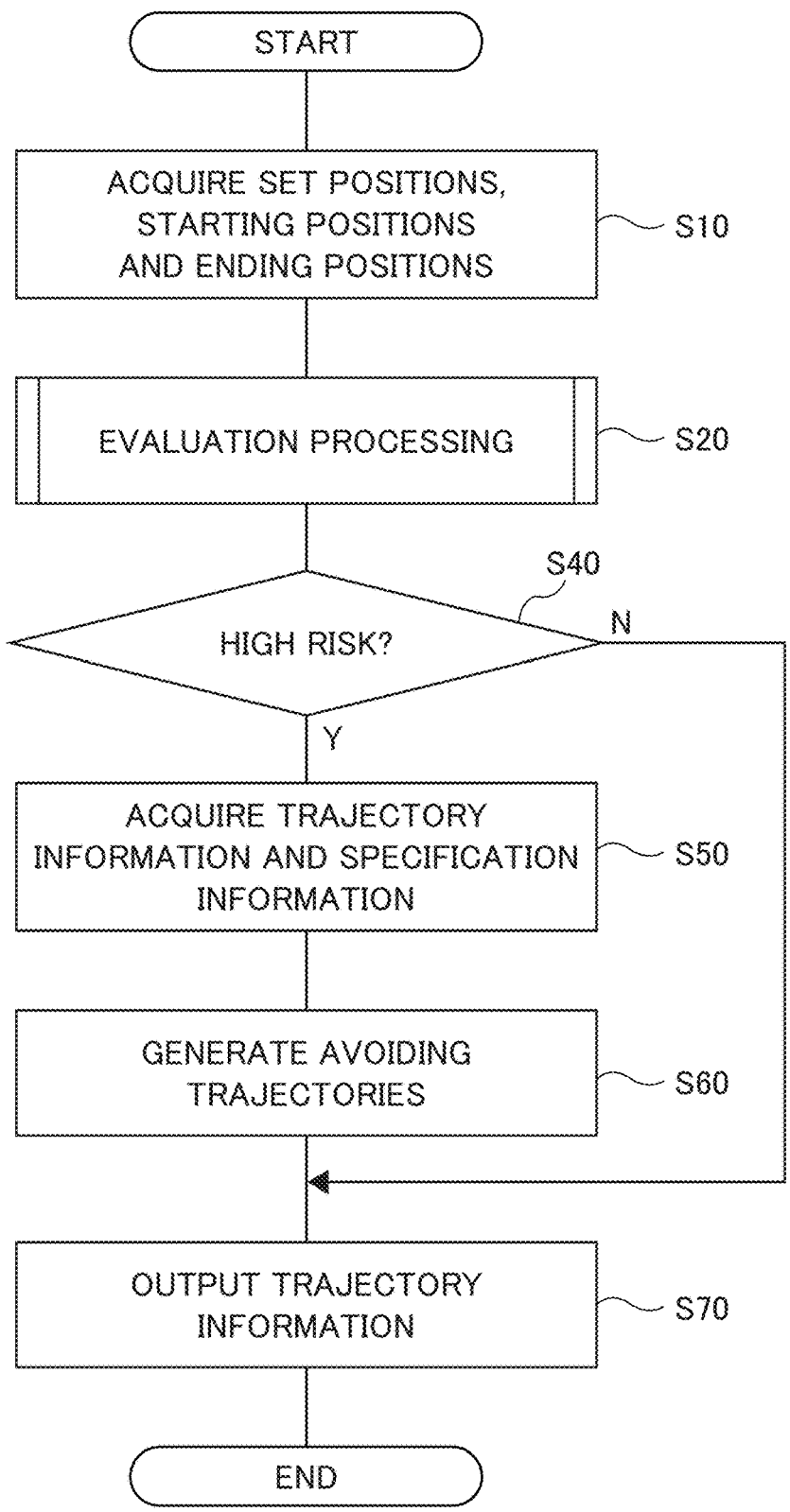
FIG. 8 is a flowchart illustrating an example of interference evaluation processing in the first embodiment.

FIG. 8 is a flowchart illustrating the flow of interference evaluation processing that is executed by the CPU 32 of the interference evaluating device 10. Due to the CPU 32 reading-out the interference evaluating program from the storage device 36, and expanding and executing the program in the memory 34, the CPU 32 functions as the respective functional structures of the interference evaluating device 10, and the interference evaluation processing illustrated in FIG. 8 is executed.

In step S10, the acquiring section 22 acquires the set position R, the starting position S and the ending position G of each of the robots 16A, 16B, which were inputted to the interference evaluating device 10 by a user. The acquiring section 22 transfers the information of the acquired set positions R, starting positions S and ending positions G to the evaluating section 24.

Figure 9:
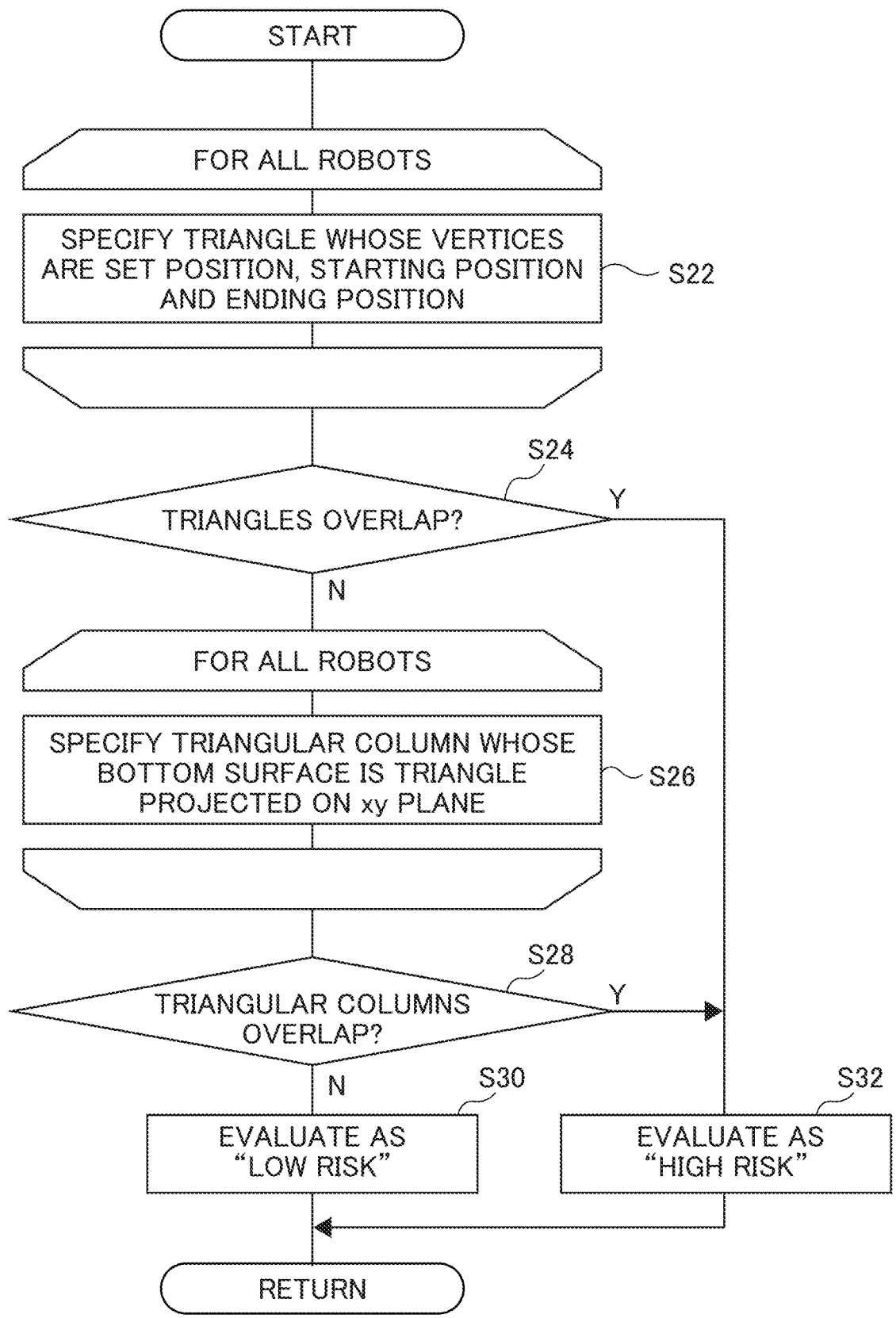
FIG. 9 is a flowchart illustrating an example of evaluation processing.

Next, in step S20, evaluation processing is executed. The evaluation processing is described here with reference to FIG. 9.

In step S22, the evaluating section 24 specifies the triangle 101, whose vertices are the set position R, the starting position S and the ending position G, for each of the robots 16.

Next, in step S24, the evaluating section 24 judges whether or not there exists an overlapping portion at the triangles 101 specified for the respective robots 16. In a case in which an overlapping portion exists, processing moves on to step S32, and, in a case in which no overlapping portion exists, processing moves on to step S26.

In step S26, the evaluating section 24 specifies, for each of the robots 16, the triangular column 103 of a predetermined height whose bottom surface is the triangle 102 obtained by projecting, onto the xy plane that is the plane in which the robot 16 is set, the triangle 101 that was specified in above-described step S22.

Next, in step S28, the evaluating section 24 judges whether or not there exists an overlapping portion at the triangular columns 103 specified for the respective robots 16. In a case in which an overlapping portion exists, processing moves on to step S32, and, in a case in which no overlapping portion exists, processing moves on to step S30.

In step S30, the evaluating section 24 transfers results of evaluation that express "low risk" to the generating section 26. On the other hand, in step S32, the evaluating section 24 transfers results of evaluation that express "high risk" to the generating section 26. Then, processing returns to the interference evaluation processing (FIG. 8).

Next, in step S40 of the interference evaluation processing illustrated in FIG. 8, the generating section 26 judges whether or not the evaluation results transferred from the evaluating section 24 are "high risk". In a high risk case, processing moves on to step S50, and, in a low risk case, processing moves on to step S70.

In step S50, the generating section 26 acquires the trajectory information and the specification information of each robot 16. Next, in step S60, the generating section 26 generates avoiding trajectories so as to avoid the risk of interference.

Next, in step S70, in a case in which the generating section 26 generates avoiding trajectories, i.e., in a high risk case, the generating section 26 outputs trajectory information expressing the avoiding trajectories to the robot controlling device 12. Further, in a case in which the generating section 26 does not generate avoiding trajectories, i.e., in a low risk case, the generating section 26 outputs the acquired trajectory information as is to the robot controlling device 12. Then, the interference evaluation processing ends.

As described above, in the robot controlling system relating to the first embodiment, the interference evaluating device evaluates the risk of interference between robots on the basis of the overlapping of polyhedrons (triangular columns) that are based on the set positions, the starting positions and the ending positions of the respective robots. Due thereto, there is no need to move actual robots or carry out simulations, and the computing costs required for evaluating interference between robots can be reduced.

Second Embodiment

A second embodiment is described next. Note that, in the robot controlling system relating to the second embodiment, structures that are similar to those of the robot controlling system 100 relating to the first embodiment are denoted by the same reference numerals, and detailed description thereof is omitted.

As illustrated in FIG. 1, a robot controlling system 200 relating to the second embodiment is structured to include an interference evaluating device 210, the robot controlling device 12, and the robots 16A, 16B.

Figure 10:
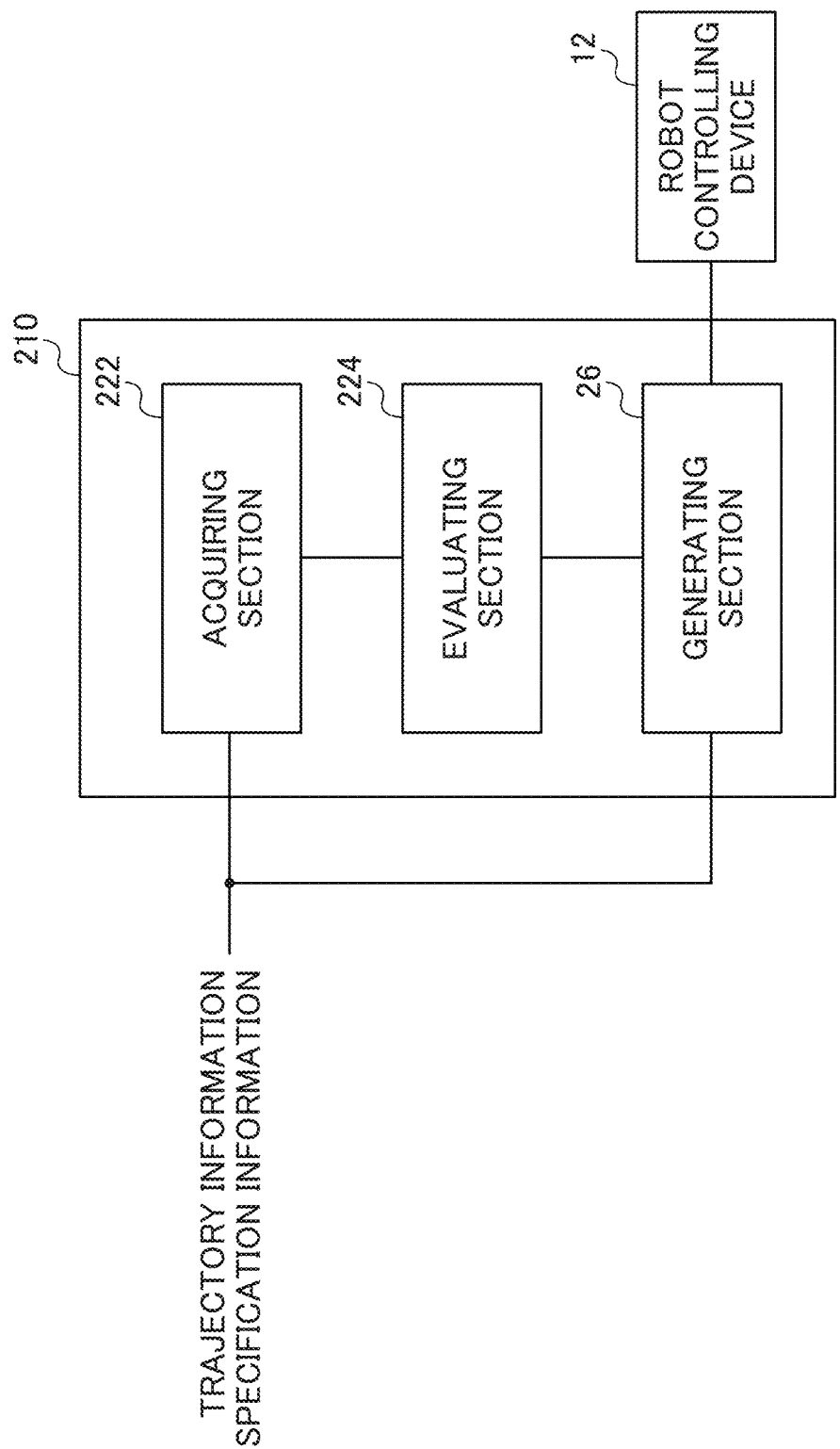
FIG. 10 is a block drawing illustrating an example of functional structures of the interference evaluating device relating to the second embodiment.

FIG. 10 is a block drawing illustrating an example of the functional structures of the interference evaluating device 210. As illustrated in FIG. 10, the interference evaluating device 210 includes, as the functional structures thereof, an acquiring section 222, an evaluating section 224 and the generating section 26.

For each of the robots 16, the acquiring section 222 acquires the trajectory information and the specification information, and, on the basis of the trajectory information and the specification information, computes the set position R, the starting position S and the ending position G of each robot 16.

Figure 11:
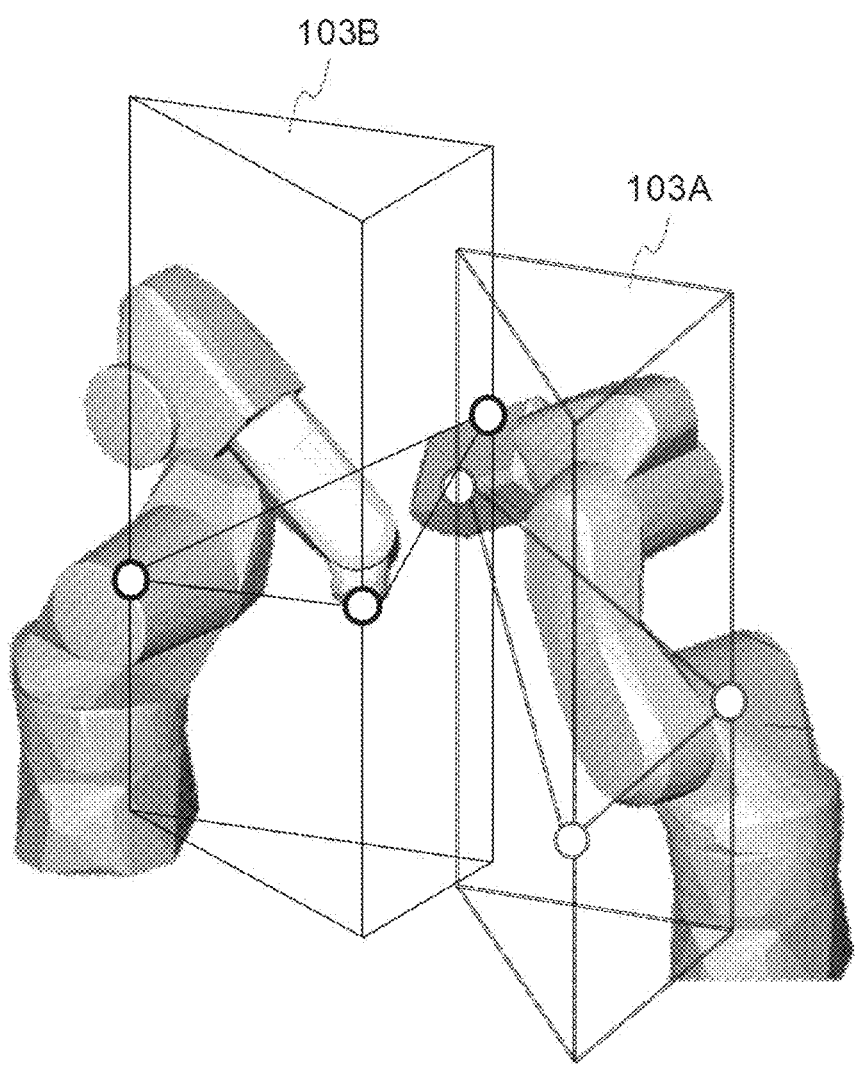
FIG. 11 is a drawing for explaining a comparison of the triangular columns and polyhedrons that are based on the set positions, the starting positions, the ending positions, and via points.

Here, as illustrated in FIG. 11, the triangular columns 103, which are based on the set positions R, the starting positions S and the ending positions G of the respective robots 16, are polyhedrons that take into consideration trajectories of the shortest distances from the starting positions to the ending positions. Thus, in the second embodiment, evaluation of the risk of interference is carried out in more detail and more precisely, by using polyhedrons that also take into consideration via points on the trajectories from the starting positions to the ending positions. Therefore, as illustrated in FIG. 12, the acquiring section 222 also computes position M of one or more via points between the starting position S and the ending position G.

Specifically, on the basis of the acquired specification information, the acquiring section 222 computes, as the set position R, a spatial position of a predetermined point that is a movable point of origin of the robot 16, such as the center of rotation or the like. Further, on the basis of the starting pose, the pose of the via point, and the ending pose which are included in the trajectory information of each of the robots 16, and the kinematic information that is included in the specification information, the acquiring section 222 computes the spatial positions of the end effector of the robot 16 at times of the respective poses, as the starting position S, the position M of the via point, and the ending position G.

The acquiring section 222 transfers, to the evaluating section 224, the information of the computed set position R, starting position S, position M of the via point, and ending position G of each of the robots 16.

Figure 12:
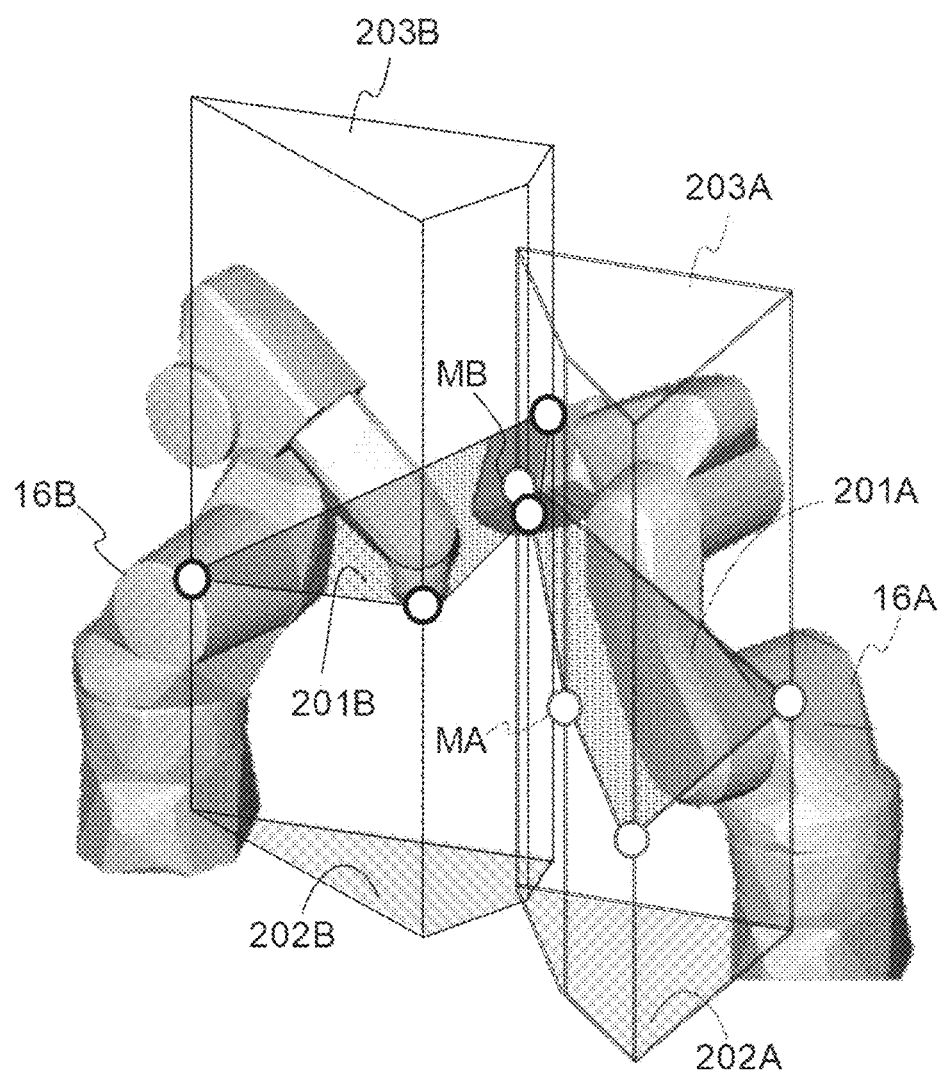
FIG. 12 is a drawing for explaining the polyhedrons that are based on the set positions, the starting positions, the ending positions, and the via points.

As illustrated in FIG. 12, in the same way as with the triangular column 103 in the first embodiment, the evaluating section 224 specifies, for each of the robots 16, a polyhedron 203 of a predetermined height (e.g., the highest reached point of the end effector of the robot 16) whose bottom surface is a polygon 202 that is obtained by projecting, onto the xy plane that is the plane in which the robot 16 is set, a polygon 201 whose vertices are the set position R, the starting position S, the position M of the via point, and the ending position G. Note that, in FIG. 12, A is appended to the reference numerals for the robot 16A, and B is appended to the reference numerals for the robot 16B.

Even if the risk is evaluated as being low in a case in which the risk of interference is evaluated on the basis of the absence/presence of overlapping of the triangular columns 103 as illustrated in FIG. 11, if the polyhedrons 203 that also take via points into consideration are used as illustrated in FIG. 12, overlapping of the polyhedrons 203 exists at the robots 16A, 16B, and the risk is evaluated as being high.

In the same way as the evaluating section 24 of the first embodiment, the evaluating section 224 evaluates the risk of interference from the absence/presence of overlapping of the polyhedrons 203.

Because the hardware structures of the interference evaluating device 210 are similar to the hardware structures of the interference evaluating device 10 relating to the first embodiment and illustrated in FIG. 2, description thereof is omitted.

Operation of the robot controlling system 200 relating to the second embodiment is described next.

Figure 13:
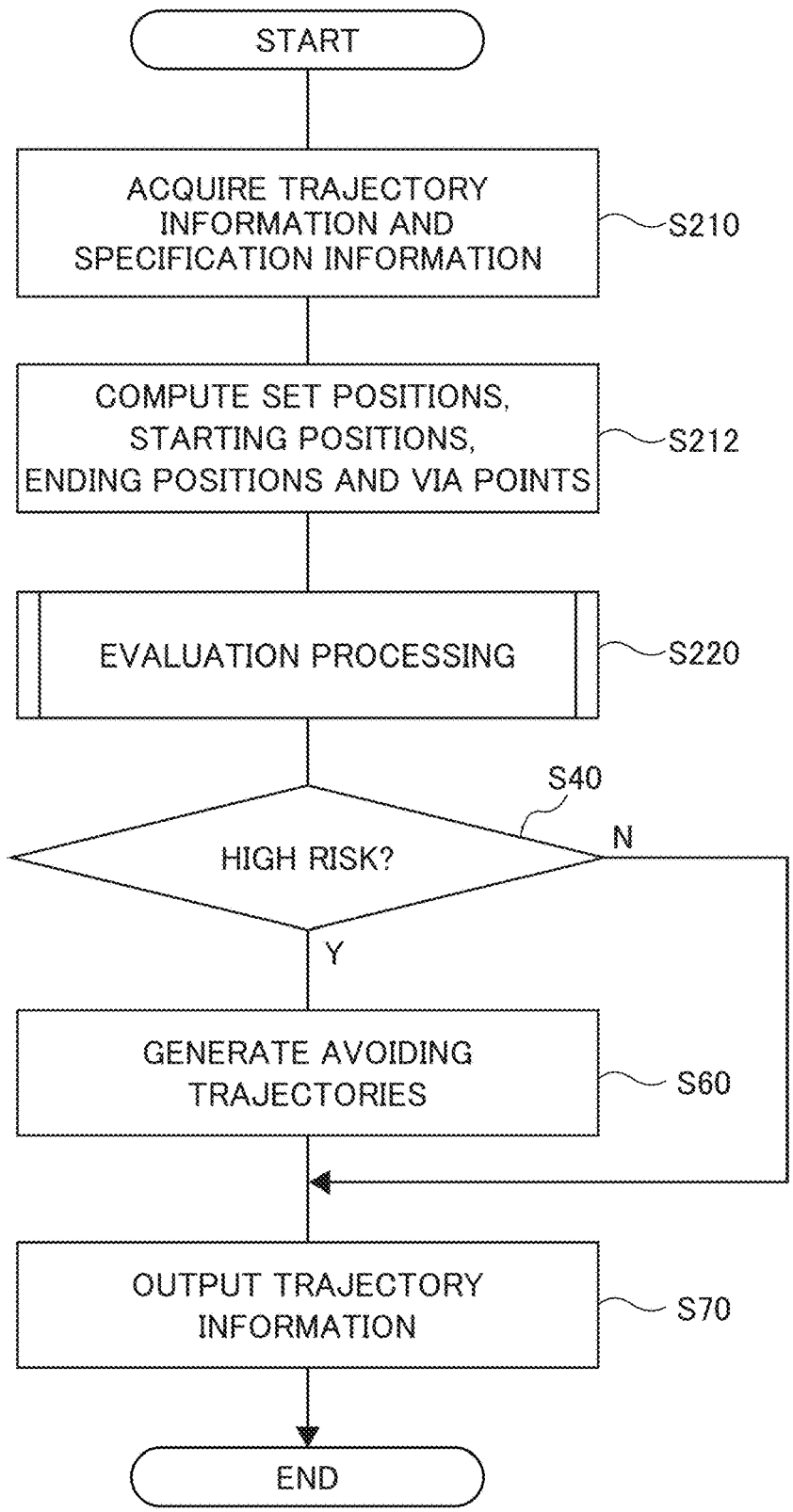
FIG. 13 is a flowchart illustrating an example of interference evaluation processing in the second embodiment.

FIG. 13 is a flowchart illustrating the flow of interference evaluation processing that is executed by the CPU 32 of the interference evaluating device 210. Due to the CPU 32 reading-out the interference evaluating program from the storage device 36, and expanding and executing the program in the memory 34, the CPU 32 functions as the respective functional structures of the interference evaluating device 210, and the interference evaluation processing illustrated in FIG. 13 is executed. Note that, in the interference evaluation processing illustrated in FIG. 13, processings that are similar to those of the interference evaluation processing (FIG. 8) of the first embodiment are denoted by the same step numbers, and detailed description thereof is omitted.

In step S210, the acquiring section 222 and the generating section 26 respectively acquire the trajectory information and the specification information for each of the robots 16. Next, in step S212, on the basis of the acquired trajectory information and specification information, the acquiring section 222 computes the set position R, the starting position S, the position M of the via point, and the ending position G of each of the robots 16.

Next, in step 220, evaluation processing is executed. In this evaluation processing, in the evaluation processing (FIG. 9) of the first embodiment, it suffices to replace the triangles 101 in steps S22 and S24 with the polygons 201, and to replace the triangular columns 103 in steps S26 and S28 with the polyhedrons 203.

Thereafter, the processings of steps S40, S60 and S70 are executed, and the interference evaluation processing ends.

As described above, in the robot controlling system relating to the second embodiment, the interference evaluating device evaluates interference between robots on the basis of the overlapping of polyhedrons that are based on the set position, the starting position, the position of a via point, and the ending position of each robot. Due thereto, there is no need to move actual robots or carry out simulations, and the computing costs required for evaluating interference between robots can be reduced. Moreover, the risk of interference can be evaluated in more detail and more precisely than in a case in which triangular columns are used as in the first embodiment.

Note that, although the second embodiment describes a case in which the acquiring section computes the respective positions on the basis of the trajectory information and the specification information, the second embodiment is not limited to this. Information of the respective positions that is inputted by a user may be acquired, as in the first embodiment.

Third Embodiment

A third embodiment is described next. Note that, in the robot controlling system relating to the third embodiment, structures that are similar to those of the robot controlling system 100 relating to the first embodiment are denoted by the same reference numerals, and detailed description thereof is omitted.

As illustrated in FIG. 1, a robot controlling system 300 relating to the third embodiment is structured to include an interference evaluating device 310, the robot controlling device 12, and the robots 16A, 16B.

Figure 14:
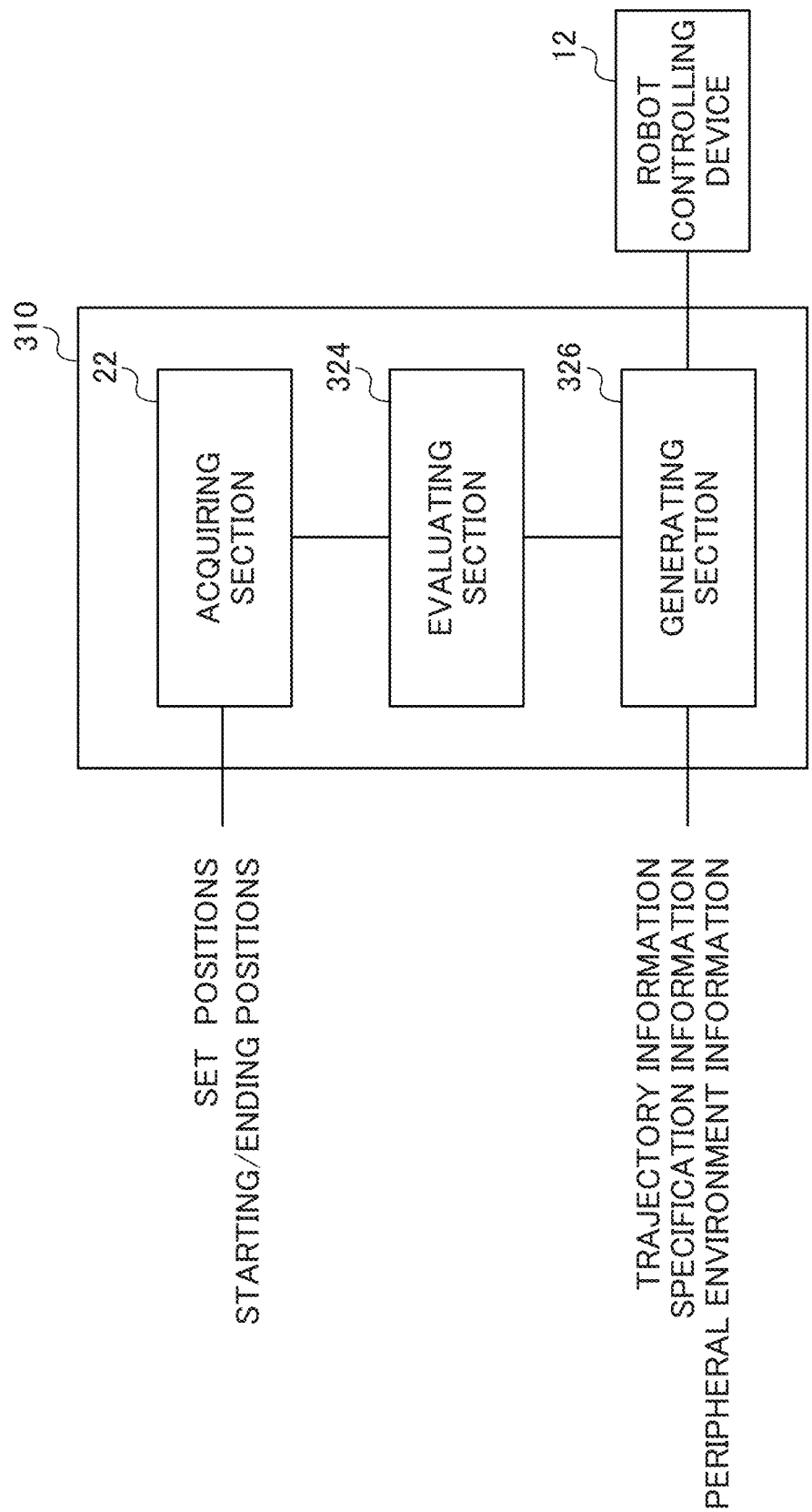
FIG. 14 is a block drawing illustrating an example of functional structures of the interference evaluating device relating to the third embodiment.

FIG. 14 is a block drawing illustrating an example of the functional structures of the interference evaluating device 310. As illustrated in FIG. 14, the interference evaluating device 310 includes, as the functional structures thereof, the acquiring section 22, an evaluating section 324 and a generating section 326.

In the same way as the evaluating section 24 of the first embodiment, the evaluating section 324 specifies the triangular column 103 that is based on the set position R, the starting position S and the ending position G for each of the robots 16, and evaluates the risk of interference on the basis of the overlapping of the triangular columns 103.

In the second embodiment, the evaluating section 324 computes a risk evaluation value on the basis of the position and the volume of the overlapping portion of the triangular columns 103. For example, in a case in which the overlapping portion of the triangular columns 103 is near to the starting position or the ending position of either of the robots 16, it is difficult to generate the avoiding trajectories, and therefore, the evaluating section 324 computes the risk evaluation value such that the risk is high. Further, the evaluating section 324 computes the risk evaluation value such that, the greater the volume of the overlapping portion of the triangular columns 103, the higher the risk. The evaluating section 324 transfers the computed risk evaluation value to the generating section 326.

The generating section 326 generates avoiding trajectories in a case in which the risk evaluation value that has been transferred thereto from the evaluating section 324 is greater than or equal to a predetermined threshold value. Further, at the time of generating the avoiding trajectories, the generating section 326 acquires, in addition to the trajectory information and the specification information, peripheral environment information that includes information of objects such as obstacles and the like that are at peripheries of where the robots 16A, 16B move. Further, the generating section 326 generates avoiding trajectories that avoid the objects at the periphery in addition to the overlapping portion of the triangular columns 103. Methods of generating the avoiding trajectories are similar to those of the first embodiment.

Because the hardware structures of the interference evaluating device 310 are similar to the hardware structures of the interference evaluating device 10 relating to the first embodiment and illustrated in FIG. 2, description thereof is omitted.

Operation of the robot controlling system 300 relating to the third embodiment is described next.

Figure 15:
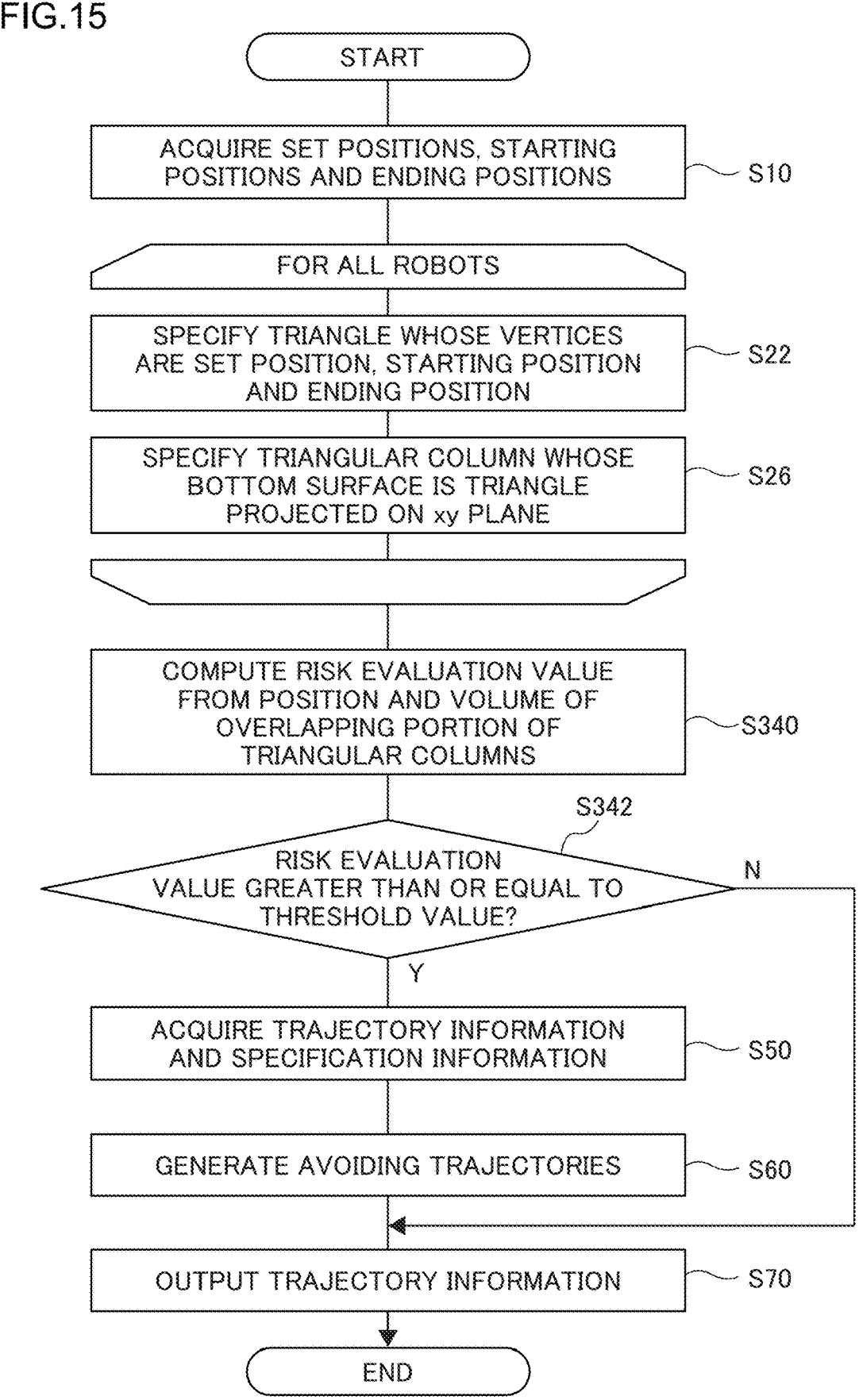
FIG. 15 is a flowchart illustrating an example of interference evaluation processing in the third embodiment.

FIG. 15 is a flowchart illustrating the flow of interference evaluation processing that is executed by the CPU 32 of the interference evaluating device 310. Due to the CPU 32 reading-out the interference evaluating program from the storage device 36, and expanding and executing the program in the memory 34, the CPU 32 functions as the respective functional structures of the interference evaluating device 310, and the interference evaluation processing illustrated in FIG. 15 is executed. Note that, in the interference evaluation processing illustrated in FIG. 15, processings that are similar to those of the interference evaluation processing (FIG. 8) of the first embodiment are denoted by the same step numbers, and detailed description thereof is omitted.

When the triangular column 103 is specified for each of the robots 16 via steps S10 through S26, in the next step S340, the evaluating section 324 computes a risk evaluation value on the basis of the position and the volume of the overlapping portion of the triangular columns 103. Then, the evaluating section 324 transfers the computed risk evaluation value to the generating section 326.

Next, in step S342, the generating section 326 judges whether or not the risk evaluation value transferred from the evaluating section 324 is greater than or equal to a predetermined threshold value. In a case in which the risk evaluation value is greater than or equal to the threshold value, i.e., in a high risk case, processing moves on to step S50, and, in a case in which the risk evaluation value is less than the threshold value, i.e., in a low risk case, processing moves on to step S70.

As described above, in the robot controlling system relating to the third embodiment, the interference evaluating device evaluates interference between robots on the basis of the overlapping of triangular columns that are based on the set positions, the starting positions and the ending positions of the respective robots, and computes a risk evaluation value. Then, in a case in which the risk evaluation value is greater than or equal to a threshold value, the interference evaluating device generates avoiding trajectories. Due thereto, there is no need to move actual robots or carry out simulations, and the computing costs required for evaluating interference between robots can be reduced. Moreover, whether or not avoiding trajectories are to be generated can be decided upon flexibly in accordance with the degree of risk, and therefore, unnecessary generation of avoiding trajectories can be suppressed.

Further, at the time of generating the avoiding trajectories, the avoiding trajectories are generated so as to avoid not only the overlapping portion of the triangular columns, but also objects such as obstacles and the like that are based on peripheral environment information. Therefore, avoiding trajectories that do not interfere with objects at the periphery as well can be generated.

Note that, although the third embodiment describes a case in which, in the same way as in the first embodiment, the acquiring section acquires information of the respective positions that has been inputted by a user, the third embodiment is not limited to this. The acquiring section may compute the respective positions on the basis of the trajectory information and the specification information, as in the second embodiment.

Fourth Embodiment

A fourth embodiment is described next. Note that, in the robot controlling system relating to the fourth embodiment, structures that are similar to those of the robot controlling system 100 relating to the first embodiment and the robot controlling system 200 relating to the second embodiment are denoted by the same reference numerals, and detailed description thereof is omitted.

As illustrated in FIG. 1, a robot controlling system 400 relating to the fourth embodiment is structured to include an interference evaluating device 410, the robot controlling device 12 and the robots 16A, 16B. Further, trajectory information and specification information, which are outputted from a work managing section 18 (see FIG. 16), are inputted to the interference evaluating device 410.

The work managing section 18 carries out task planning for executing work that includes plural motions. The task planning is carried out by deciding upon an optimal combination among combinations of arrangements of the robots 16 and trajectory information that express the respective, plural motions that are included in the work. The work managing section 18 uses the results of evaluation by the interference evaluating device 410 in this decision, and therefore, inputs trajectory information, and specification information that includes information relating to the arrangement of the robots 16, of each motion to the interference evaluating device 410.

Figure 16:
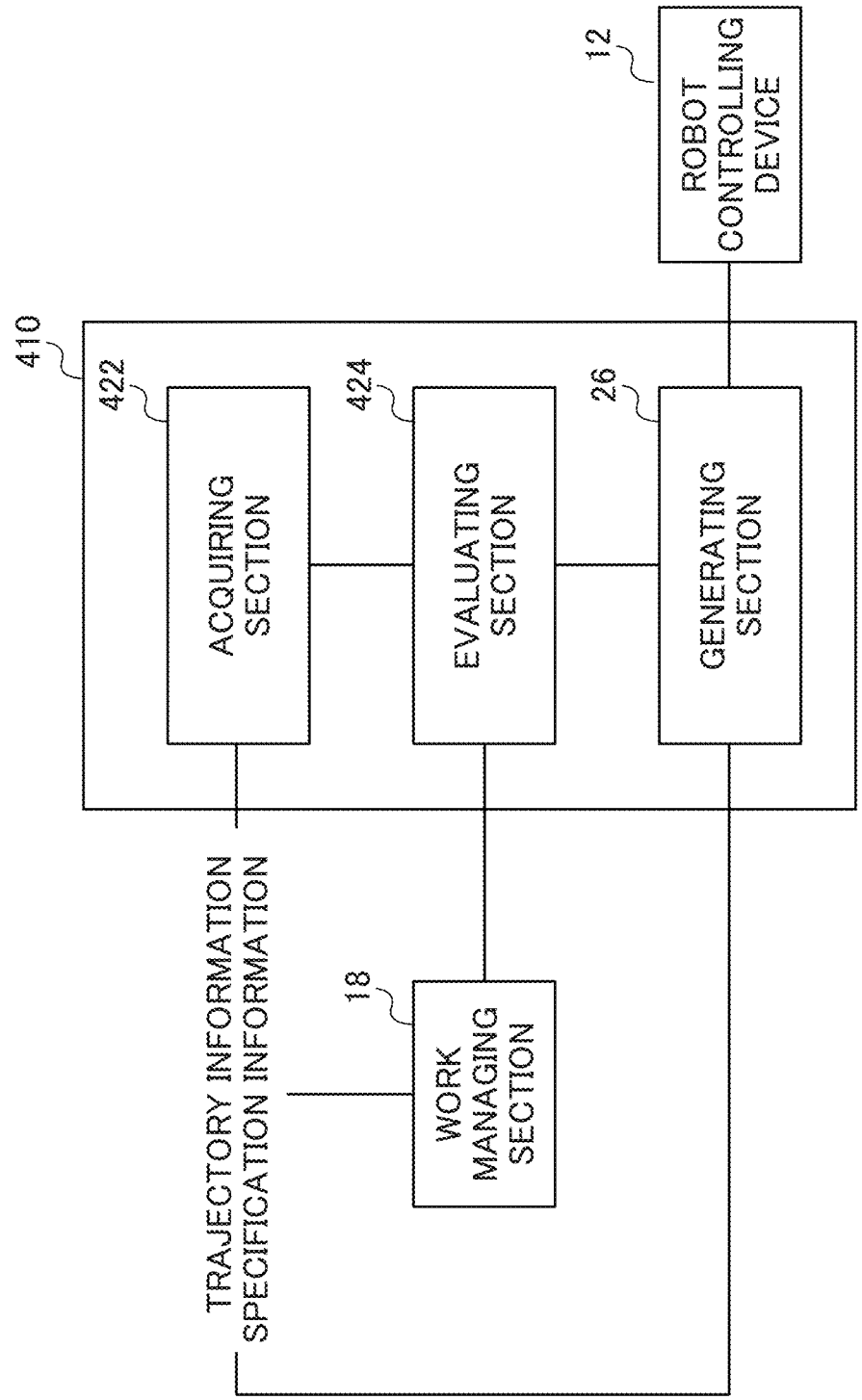
FIG. 16 is a block drawing illustrating an example of functional structures of the interference evaluating device relating to the fourth embodiment.

FIG. 16 is a block drawing illustrating an example of the functional structures of the interference evaluating device 410. As illustrated in FIG. 16, the interference evaluating device 410 includes, as the functional structures thereof, an acquiring section 422, an evaluating section 424 and the generating section 26.

The acquiring section 422 acquires the trajectory information and specification information that are inputted from the work managing section 18, and, on the basis of the acquired trajectory information and specification information, computes the set position R, the starting position S and the ending position G for each of the robots 16.

For each of the plural motions that are included in the work that is the object of the task planning, the evaluating section 424, in the same way as the evaluating section 24 of the first embodiment, specifies the triangular column 103, which is based on the set position R, the starting position S and the ending position G of each of the robots 16, on the basis of the trajectory information and specification information per motion that are acquired at the acquiring section 422. Then, from the overlapping of the triangular columns 103, the evaluating section 424 evaluates whether the risk is high or the risk is low.

On the basis of the results of evaluation for each of the plural motions, the evaluating section 424 computes a risk evaluation value for the overall work. For example, the evaluating section 424 uses, as the evaluation results of the overall work, the proportion of motions that are evaluated as being high risk, i.e., as having a risk of interference, among the motions that are included in the work. For all of the combinations that are imagined as combinations of motions that structure the work, the evaluating section 424 derives evaluation results of the overall work, and outputs these results to the work managing section 18.

Due thereto, the work managing section 18 decides upon the optimal combination of motions such as, for example, a combination in which the proportion of high-risk motions is the minimum or the like. When the work managing section 18 decides on a combination, the work managing section 18 inputs the trajectory information and the specification information to the interference evaluating device 410 for each motion included in the combination that was decided upon.

When the trajectory information and the specification information of each motion included in the decided-upon combination is inputted from the work managing section 18, the evaluating section 424 evaluates the risk of interference in the same way as in the first embodiment.

Because the hardware structures of the interference evaluating device 410 are similar to the hardware structures of the interference evaluating device 10 relating to the first embodiment and illustrated in FIG. 2, description thereof is omitted.

Operation of the robot controlling system 400 relating to the fourth embodiment is described next.

Figure 17:
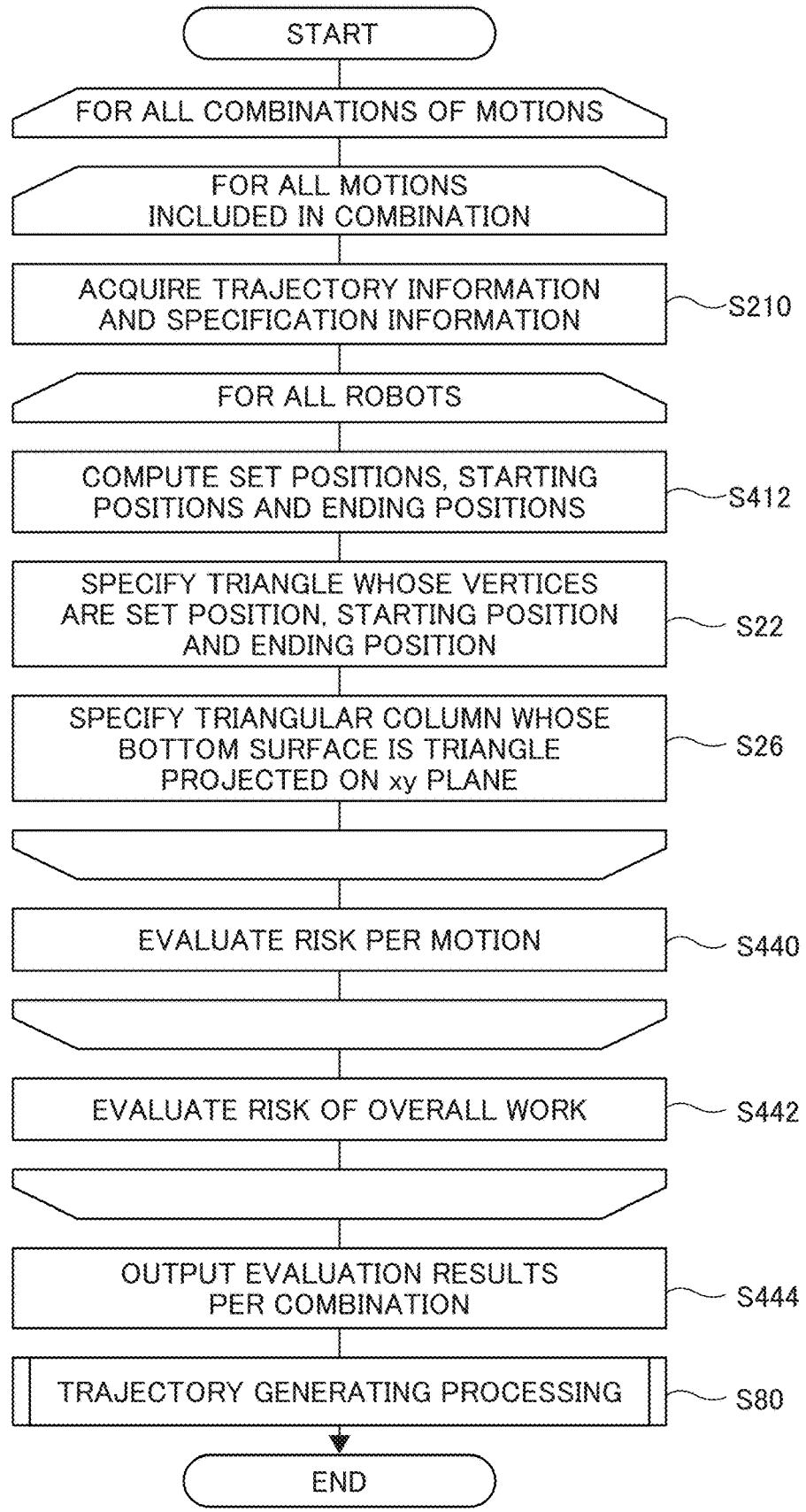
FIG. 17 is a flowchart illustrating an example of interference evaluation processing in the fourth embodiment.

FIG. 17 is a flowchart illustrating the flow of interference evaluation processing that is executed by the CPU 32 of the interference evaluating device 410. Due to the CPU 32 reading-out the interference evaluating program from the storage device 36, and expanding and executing the program in the memory 34, the CPU 32 functions as the respective functional structures of the interference evaluating device 410, and the interference evaluation processing illustrated in FIG. 17 is executed. Note that, in the interference evaluation processing illustrated in FIG. 17, processings that are similar to those of the interference evaluation processing (FIG. 8) of the first embodiment and the interference evaluation processing (FIG. 13) of the second embodiment are denoted by the same step numbers, and detailed description thereof is omitted.

In step S210, the acquiring section 422 acquires the trajectory information and specification information that are inputted from the work managing section 18.

Next, in step S412, on the basis of the acquired trajectory information and specification information, the acquiring section 422 computes the set position R, the starting position S and the ending position G for each of the robots 16. Next, in steps S22 and S26, the evaluating section 424 specifies the triangular column 103 for each of the robots 16.

Next, in step S440, for each of the plural motions that are included in the work that is the object of the task planning, the evaluating section 424 evaluates, from the overlapping of the triangular columns 103, whether there is a high risk or a low risk.

Next, in step S442, the evaluating section 424 makes the proportion of the motions, which are evaluated as being high risk, i.e., as having a risk of interference, among the motions that are included in the work, be the evaluation results of the overall work.

Next, in step S444, the evaluating section 424 outputs, to the work managing section 18, the evaluation results of the overall work that were derived in above step S442, for all of the combinations that are imagined as combinations of motions that structure the work.

Due thereto, the work managing section 18 decides upon the optimal combination of motions, and, for the respective motions that are included in the decided-upon combination, inputs the trajectory information and the specification information to the interference evaluating device 410.

Then, trajectory generating processing is executed in next step S80. The trajectory generating processing is similar to the interference evaluation processing (FIG. 8) of the first embodiment.

As described above, in the robot controlling system relating to the fourth embodiment, for work that includes plural motions, the interference evaluating device evaluates the risk of interference for each combination of motions, and the optimal combination of motions is thereby decided upon by the work managing section. Due thereto, there is no need to move actual robots or carry out simulations, and task planning in which interference between robots is suppressed can be carried out.

Note that the fourth embodiment describes a case in which the proportion of motions that are evaluated as being high risk, among the plural motions that structure the work, is used as the evaluation results of the overall work. However, the fourth embodiment is not limited to this. For example, in the same way as in the third embodiment, a risk evaluation value may be computed for each motion, and, for each combination, an integrated value, which is obtained by adding the risk evaluation values computed for the motions included in that combination, or the like, may be computed as the risk evaluation value of the overall work. In this case, the work managing section can decide upon the combination, whose risk evaluation value is the lowest, as the optimal combination.

Further, the interference evaluation processing (FIG. 13) in the second embodiment or the interference evaluation processing (FIG. 15) in the third embodiment may executed as the trajectory generating processing that is executed in step S80 of the above-described interference evaluation processing.

Fifth Embodiment

A fifth embodiment is described next. Note that, in the robot controlling system relating to the fifth embodiment, structures that are similar to those of the robot controlling system 100 relating to the first embodiment and the robot controlling system 300 relating to the third embodiment are denoted by the same reference numerals, and detailed description thereof is omitted.

As illustrated in FIG. 1, a robot controlling system 500 relating to the fifth embodiment is structured to include an interference evaluating device 510, the robot controlling device 12, and the robots 16A, 16B.

Figure 18:
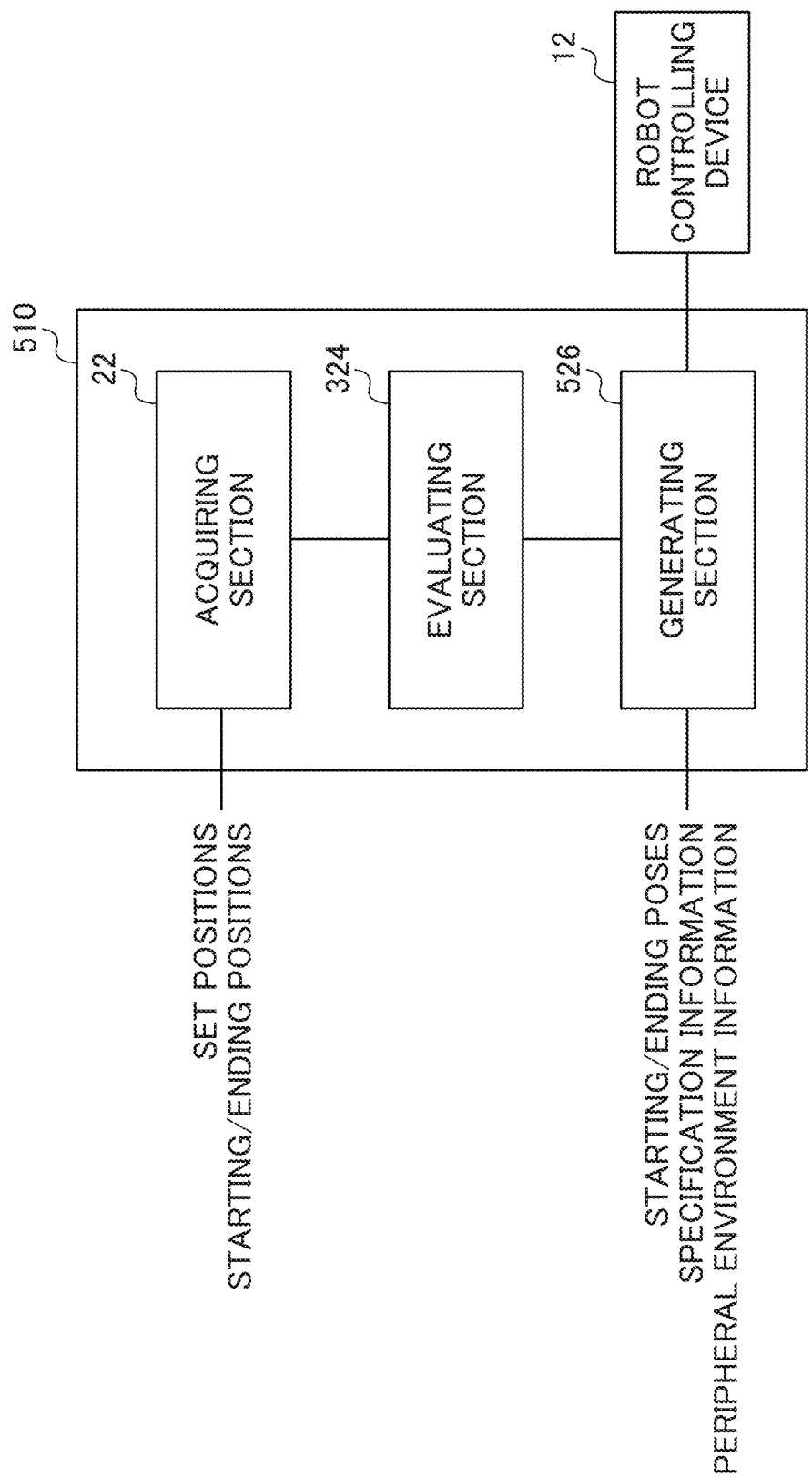
FIG. 18 is a block drawing illustrating an example of functional structures of the interference evaluating device relating to the fifth embodiment.

FIG. 18 is a block drawing illustrating an example of the functional structures of the interference evaluating device 510. As illustrated in FIG. 18, the interference evaluating device 510 includes, as the functional structures thereof, the acquiring section 22, the evaluating section 324 and a generating section 526.

The generating section 526 acquires a starting pose, an ending pose, specification information and peripheral environment information. In a case in which the risk evaluation value that is transferred from the evaluating section 324 is greater than or equal to a first threshold value, the generating section 526 generates avoiding trajectories that are from the starting poses to the ending poses, so as to avoid the risk of interference. Further, in a case in which the risk evaluation value is less than the first threshold value, the generating section 526 generates trajectories that simply connect the starting poses and the ending poses. Moreover, in a case in which the risk evaluation value is greater than the first threshold value and greater than or equal to the second threshold value, the generating section 526 may, without generating trajectories, output, to the outputting device 40, a message urging the user to input other starting positions and ending positions. The second threshold value is set to a value by which it can be judged that there is a case in which the risk of interference is markedly great.

Because the hardware structures of the interference evaluating device 510 are similar to the hardware structures of the interference evaluating device 10 relating to the first embodiment and illustrated in FIG. 2, description thereof is omitted.

Operation of the robot controlling system 500 relating to the fifth embodiment is described next.

Figure 19:
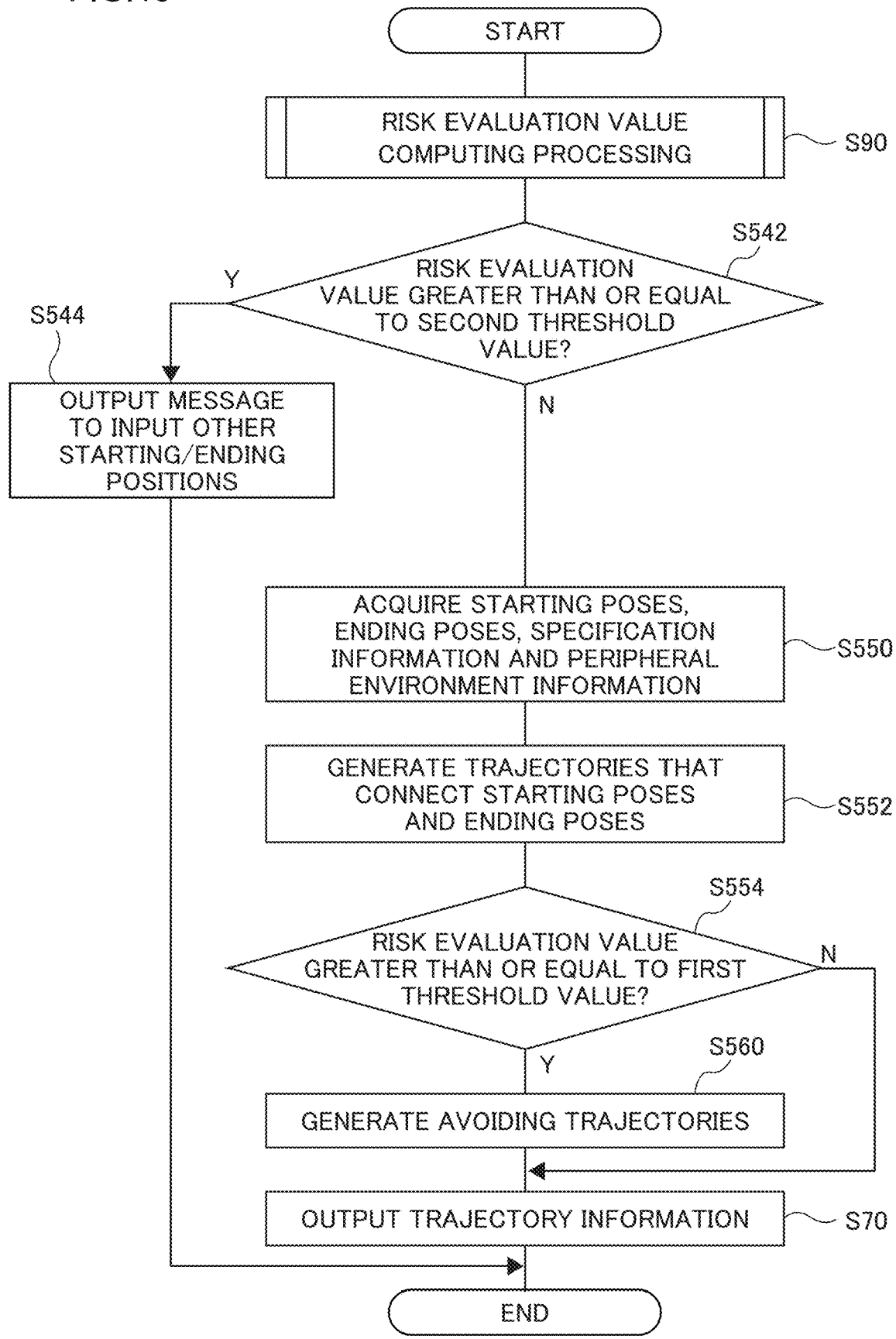
FIG. 19 is a flowchart illustrating an example of interference evaluation processing in the fifth embodiment.

FIG. 19 is a flowchart illustrating the flow of interference evaluation processing that is executed by the CPU 32 of the interference evaluating device 510. Due to the CPU 32 reading-out the interference evaluating program from the storage device 36, and expanding and executing the program in the memory 34, the CPU 32 functions as the respective functional structures of the interference evaluating device 510, and the interference evaluation processing illustrated in FIG. 19 is executed. Note that, in the interference evaluation processing illustrated in FIG. 19, processings that are similar to those of the interference evaluation processing (FIG. 8) of the first embodiment are denoted by the same step numbers, and detailed description thereof is omitted.

In step S90, risk evaluation value computing processing is executed. The risk evaluation value computing processing is similar to steps S10 through S340 of the interference evaluation processing (FIG. 15) in the third embodiment.

Next, in step S542, the generating section 526 judges whether or not the risk evaluation value that was transferred from the evaluating section 324 is greater than or equal to the predetermined second threshold value, i.e., whether or not the risk of interference is markedly great. In a case in which the risk evaluation value is greater than or equal to the second threshold value, processing moves on to step S544, and, in a case in which the risk evaluation value is less than the second threshold value, processing moves on to step S550.

In step S544, the generating section 526 outputs, to the outputting device 40, a message urging the user to input other starting positions and ending positions, and the interference evaluation processing ends.

On the other hand, in step S550, the generating section 526 acquires the starting poses, the ending poses, the specification information, and the peripheral environment information. Then, in next step S552, the generating section 526 generates trajectories that simply connect the starting poses and the ending poses.

Next, in step S554, the generating section 526 judges whether or not the risk evaluation value that was transferred from the evaluating section 324 is greater than or equal to the predetermined first threshold value. In a case in which the risk evaluation value is greater than or equal to the first threshold value, i.e., in a case in which the risk is high, processing moves on to step S60, and, in a case in which the risk evaluation value is less than the first threshold value, processing moves on to step S70.

In step S560, the generating section 526 generates avoiding trajectories in which trajectories, which are such that interference is avoided, are added to the trajectories that were generated in above-described step S552.

Note that the judgment of step S554 may be carried out after above-described step S550, and the trajectories may be generated in accordance with the results of judgment. Namely, in a case in which the risk evaluation value is greater than or equal to the first threshold value, trajectories from the starting poses to the ending poses may be generated so as to avoid the risk of interference, and, in a case in which the risk evaluation value is less than the first threshold value, simple trajectories such as those of above-described step S552 may be generated.

As described above, in the robot controlling system relating to the fifth embodiment, at a stage in which trajectory information of the respective robots has not been generated, the interference evaluating device evaluates interference between the robots on the basis of overlapping of triangular columns that are based on the set positions, the starting positions and the ending positions of the respective robots. Then, after evaluation of the risk is carried out, trajectories from the starting poses to the ending poses are generated, and, in a case in which there is the risk of interference, avoiding trajectories are generated. Due thereto, in a case in which there is the risk of interference, there is no need to carry out the unnecessary generation of trajectories, and the processing costs can be reduced.

Further, the above-described respective embodiments describe cases in which the interference evaluating devices and the robot controlling devices are separate devices, but there may be a form in which the interference evaluating device is incorporated into the robot controlling device. Further, the respective functional structures of the interference evaluating device may be realized by respectively different devices, and the above-described interference evaluation processing may be realized by decentralized processing.

Further, any of various types of processors other than a CPU may execute the interference evaluation processings that are executed by the CPU reading software (programs) in the above-described respective embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the interference evaluation processing may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, although the above, respective embodiments describe forms in which the interference evaluating program is stored in advance (is installed) in a storage device, the present disclosure is not limited to this. The program may be provided in a form of being stored on a storage medium such as a CD-ROM, a DVD-ROM, a flexible disk, a USB memory, or the like. Further, the program may be in a form of being downloaded from an external device via a network.

All publications, patent applications, and technical standards mentioned in the present specification are incorporated by reference into the present specification to the same extent as if such individual publication, patent application, or technical standard was specifically and individually indicated to be incorporated by reference.

EXPLANATION OF REFERENCE NUMERALS

10, 210, 310, 410, 510 interference evaluating device
12 robot controlling device
16 robot
18 work managing section
22, 222, 422 acquiring section
24, 224, 324, 424 evaluating section
26, 326, 526 generating section
32 CPU
34 memory
36 storage device
38 inputting device
40 outputting device
42 storage medium reading device
44 communication I/F
46 bus
100, 200, 300, 400, 500 robot controlling system

The invention claimed is:

1. An interference evaluating device comprising:
a processor;
a memory storing instructions for execution by the processor including instructions for:
acquiring set positions that are points of origin of movable ranges of a plurality of robots, respectively, starting positions that are positions of predetermined regions of the plurality of robots, respectively, at times of being in starting poses, and ending positions that are positions of the predetermined regions at times of being in ending poses; and
evaluating a risk of interference among the plurality of robots based on overlapping of polyhedrons that are specified based on polygons that include the set positions, the starting positions and the ending positions of the plurality of robots respectively,
wherein the instructions for execution by the processor include instructions for specifying the polyhedrons whose bottom surfaces are polygons obtained by projecting the polygons onto planes that are planes in which the robots are set, and that have predetermined heights in directions normal to the planes.

2. The interference evaluating device of claim 1, wherein the instructions for execution by the processor include instructions for acquiring the starting positions corresponding to the starting poses and the ending positions that correspond to the ending poses, which are included in trajectory information that expresses trajectories of motions of the plurality of robots respectively.

3. The interference evaluating device of claim 1, wherein the instructions for execution by the processor include instructions for acquiring for the plurality of robots respectively, trajectory information expressing trajectories of motions and including information of the starting poses and the ending poses, and specification information including kinematic information and shape information, and, based on the trajectory information and the specification information, computing the setting positions, the starting positions and the ending positions of the plurality of robots respectively.

4. The interference evaluating device of claim 3, wherein the instructions for execution by the processor include instructions for specifying the polyhedrons based on the polygons that further include, as vertices thereof, positions of via points that are other than the starting positions and the ending positions and that are included in the trajectory information.

5. The interference evaluating device of claim 3, wherein the instructions for execution by the processor include instructions for:
acquiring the trajectory information and the specification information per motion of work that includes a plurality of motions, and evaluating risk of the overall work by evaluating interference risk between the robots for each combination of the plurality of motions structuring the work.

6. The interference evaluating device of claim 5, wherein, the higher a proportion of motions, which have a risk of interference between robots, among the plurality of motions that are included in the work, the higher the risk of the overall work is evaluated to be by the evaluating section.

7. The interference evaluating device of claim 1, wherein the instructions for execution by the processor include instructions for generating trajectories from the starting poses to the ending poses.

8. The interference evaluating device of claim 7, wherein the instructions for execution by the processor include instructions for generating avoiding trajectories that avoid interference, in a case in which it is evaluated that there is a risk of interference between the robots by the evaluating section.

9. The interference evaluating device of claim 8, wherein the instructions for execution by the processor include instructions for acquiring peripheral environment information that includes information of objects at peripheries of areas in which the plurality of robots move, and generating the avoiding trajectories that avoid an overlapping portion of the polyhedrons, and the objects that are at the peripheries of the plurality of robots.

10. The interference evaluating device of claim 8, wherein the instructions for execution by the processor include instructions for generating the avoiding trajectories in a case in which an interference risk evaluated by the evaluating section is greater than or equal to a threshold value.

11. An interference evaluating method comprising:
acquiring set positions that are points of origin of movable ranges of a plurality of robots, respectively, starting positions that are positions of predetermined regions of the plurality of robots, respectively, at times of being in starting poses, and ending positions that are positions of the predetermined regions at times of being in ending poses; and
evaluating a risk of interference among the plurality of robots based on overlapping of polyhedrons that are specified based on polygons that include the set positions, the starting positions and the ending positions of the plurality of robots, respectively, the evaluating a risk of interference including: specifying the polyhedrons whose bottom surfaces are polygons obtained by projecting the polygons onto planes that are planes in which the robots are set, and that have predetermined heights in directions normal to the planes.

12. A non-transitory storage medium storing an interference evaluating program executable by a computer including instructions for:
acquiring set positions that are points of origin of movable ranges of a plurality of robots, respectively, starting positions that are positions of predetermined regions of the plurality of robots, respectively, at times of being in starting poses, and ending positions that are positions of the predetermined regions at times of being in ending poses; and
evaluating a risk of interference among the plurality of robots based on overlapping of polyhedrons that are specified based on polygons that include the set positions, the starting positions and the ending positions of the plurality of robots, respectively, wherein the instructions include instructions for specifying the polyhedrons whose bottom surfaces are polygons obtained by projecting the polygons onto planes that are planes in which the robots are set, and that have predetermined heights in directions normal to the planes.

13. The interference evaluating method of claim 11, wherein the acquiring set positions that are points of origin of movable ranges of a plurality of robots, respectively, starting positions that are positions of predetermined regions of the plurality of robots, respectively, at times of being in starting poses, and ending positions that are positions of the predetermined regions at times of being in ending poses comprises:
acquiring the starting positions corresponding to the starting poses and the ending positions that correspond to the ending poses, which are included in trajectory information that expresses trajectories of motions of the plurality of robots respectively.

14. The interference evaluating method of claim 11, wherein the acquiring set positions that are points of origin of movable ranges of a plurality of robots, respectively, starting positions that are positions of predetermined regions of the plurality of robots, respectively, at times of being in starting poses, and ending positions that are positions of the predetermined regions at times of being in ending poses comprises:
acquiring for the plurality of robots respectively, trajectory information expressing trajectories of motions and including information of the starting poses and the ending poses, and specification information including kinematic information and shape information, and, based on the trajectory information and the specification information, computing the setting positions, the starting positions and the ending positions of the plurality of robots respectively.

15. The interference evaluating method of claim 13, wherein the evaluating a risk of interference among the plurality of robots based on overlapping of polyhedrons that are specified based on polygons that include the set positions, the starting positions and the ending positions of the plurality of robots, respectively comprises:
specifying the polyhedrons based on the polygons that further include, as vertices thereof, positions of via points that are other than the starting positions and the ending positions and that are included in the trajectory information.

16. The non-transitory storage medium of claim 12, wherein the instructions for execution by the process include instructions for: acquiring for the plurality of robots respectively, trajectory information expressing trajectories of motions and including information of the starting poses and the ending poses, and specification information including kinematic information and shape information, and, based on the trajectory information and the specification information, computing the setting positions, the starting positions and the ending positions of the plurality of robots respectively.

17. The non-transitory storage medium of claim 16, wherein the instructions for execution by the process include instructions for: specifying the polyhedrons based on the polygons that further include, as vertices thereof, positions of via points that are other than the starting positions and the ending positions and that are included in the trajectory information.

18. The non-transitory storage medium of claim 12, wherein the instructions for execution by the process include instructions for: generating trajectories from the starting poses to the ending poses.

* * * * *